United States Patent [19]
Milbury

[11] Patent Number: 6,131,381
[45] Date of Patent: Oct. 17, 2000

[54] LAWN RAKE AND CROSS HEAD ASSEMBLY

[76] Inventor: Thomas G. Milbury, 26 Carolina Dr., New City, N.Y. 10956

[21] Appl. No.: 09/105,931

[22] Filed: Jun. 27, 1998

[51] Int. Cl.[7] .................... A01D 7/00; A01B 1/00
[52] U.S. Cl. ............................ 56/400.17; 56/400.01; 56/400.21; 172/371
[58] Field of Search .................. 56/400.01, 400.17, 56/400.19, 400.21; 172/371, 378

[56] References Cited

U.S. PATENT DOCUMENTS

| | | | |
|---|---|---|---|
| 566,048 | 8/1896 | Woeber | 56/400.17 |
| 567,129 | 8/1896 | Gibbs | 56/400.01 |
| 1,614,385 | 1/1927 | Otto | 56/400.17 |
| 1,621,276 | 3/1927 | Richardson | 56/400.17 |
| 1,735,237 | 11/1929 | Dennis | 56/400.17 |
| 1,831,009 | 11/1931 | Kimber | 56/400.17 |
| 1,933,636 | 11/1933 | Montan | 56/400.17 |
| 1,942,629 | 1/1934 | Withington | 56/400.17 |
| 1,970,616 | 8/1934 | Montan | 56/400.17 |
| 2,075,220 | 3/1937 | Neuhausen | 56/400.17 |
| 2,095,693 | 10/1937 | Fuller | 56/400.17 |
| 2,119,165 | 5/1938 | Hornstein | 172/378 |
| 2,156,480 | 5/1939 | Owen | 56/400.17 |
| 2,302,541 | 11/1942 | Fuller | 56/400.17 |
| 2,490,710 | 12/1949 | Rugg | 56/400.17 |
| 2,850,865 | 9/1958 | Anderson | 56/400.17 |
| 4,376,367 | 3/1983 | Rocquin | 56/400.17 |
| 4,649,698 | 3/1987 | Sykora | 56/400.17 |
| 4,970,853 | 11/1990 | Greene, III | 56/400.01 |
| 5,022,221 | 6/1991 | Bonnes et al. | 56/400.17 |
| 5,522,209 | 6/1996 | Petruzzelli | 56/400.16 |

FOREIGN PATENT DOCUMENTS

| | | | |
|---|---|---|---|
| 123728 | 3/1947 | Australia | 56/400.21 |
| 957778 | 8/1949 | France | 56/400.01 |
| 816168 | 10/1951 | Germany | 56/400.21 |
| 56764 | 6/1936 | Norway | 56/400.17 |

*Primary Examiner*—Robert E. Pezzuto
*Assistant Examiner*—Gary S. Hartmann

[57] ABSTRACT

A lawn rake (100) has a cross head assembly (130) attached to a handle (120). A truncated tee (150) mounted on the cross arm (145) of the cross head assembly (130) receives the handle (120). A plurality of tines (170) is carried by the cross arm (145). The cross arm (145) is tubular and has a plurality of pairs (162) of apertures (164). The apertures (164) are larger than the cross section of the tines (170). The tines (170) are inserted through, and loosely positioned by, the apertures (164). The plurality of tines (170) forms an array (160) that is generally coplanar. The array (160) may form an obtuse angle with respect to the handle (120). Embodiments of the rake include arrays of tines (170) configured to form alternating rows of tines or a curvilinear arrangement of tines. A looped bend (178) formed in the end of each tine (170) distal to the ground engaging tip (176), snaps around the cross arm (145) to pivotally mount each tine (170). The tines (170) are replaceable, and are mountable on and removable from the cross arm (145) by application of finger force. The tines (170) are releasable. During raking action, an impact load directed upwardly on a tip (176) may cause release of the looped bend (178) from the cross arm (145), thereby preventing breakage of the tine (170). The lawn rake (100) can be used in a push mode. The lawn rake (100) may be distributed as a kit of parts. Components of lawn rake (100) are preferably made from a thermoplastic material. In particular the thermoplastic material may be polyvinylchloride.

84 Claims, 11 Drawing Sheets

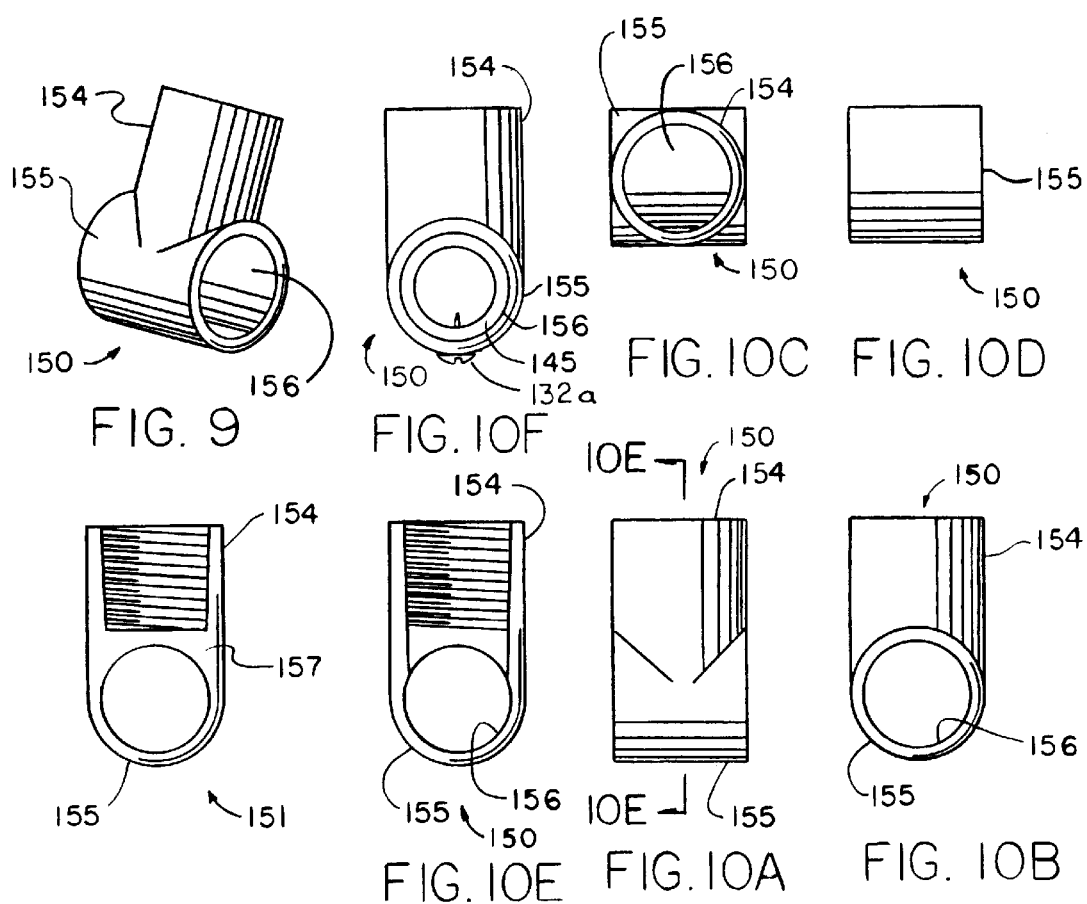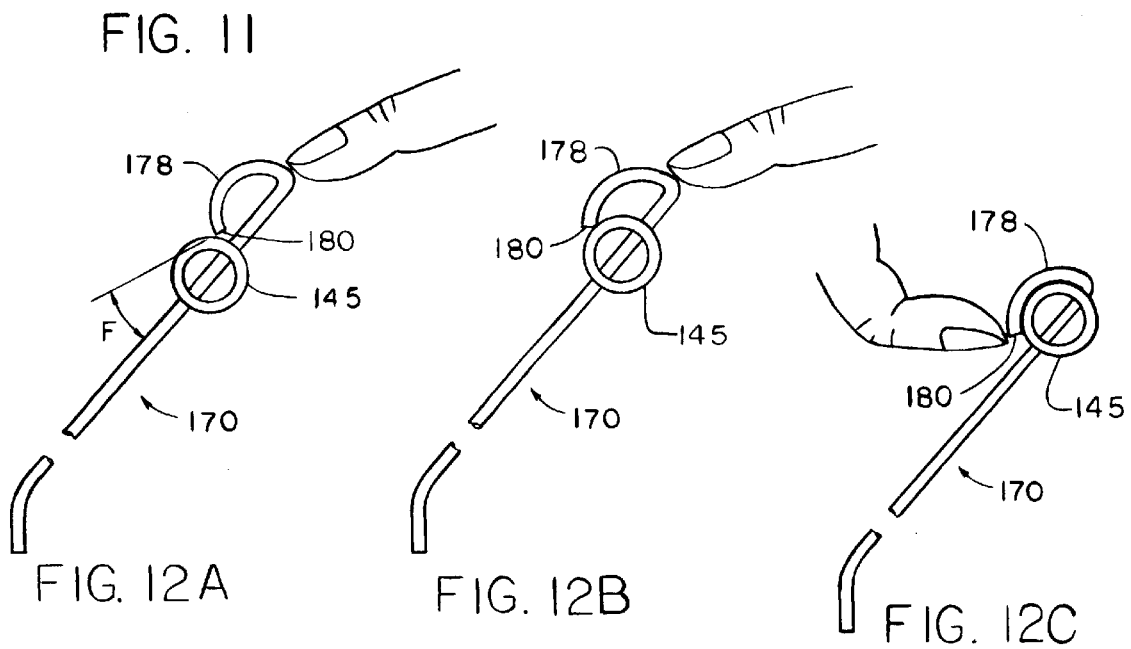

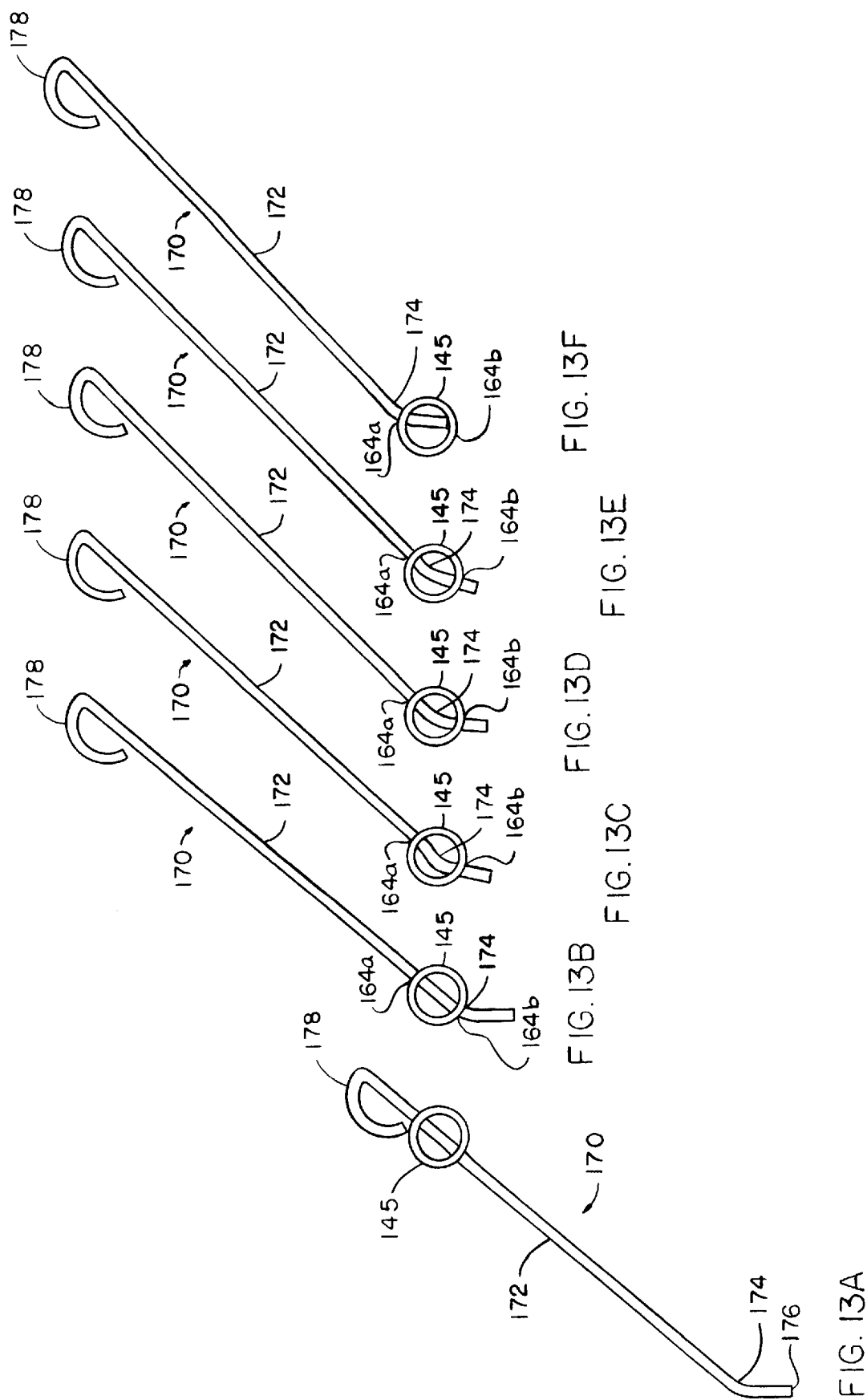

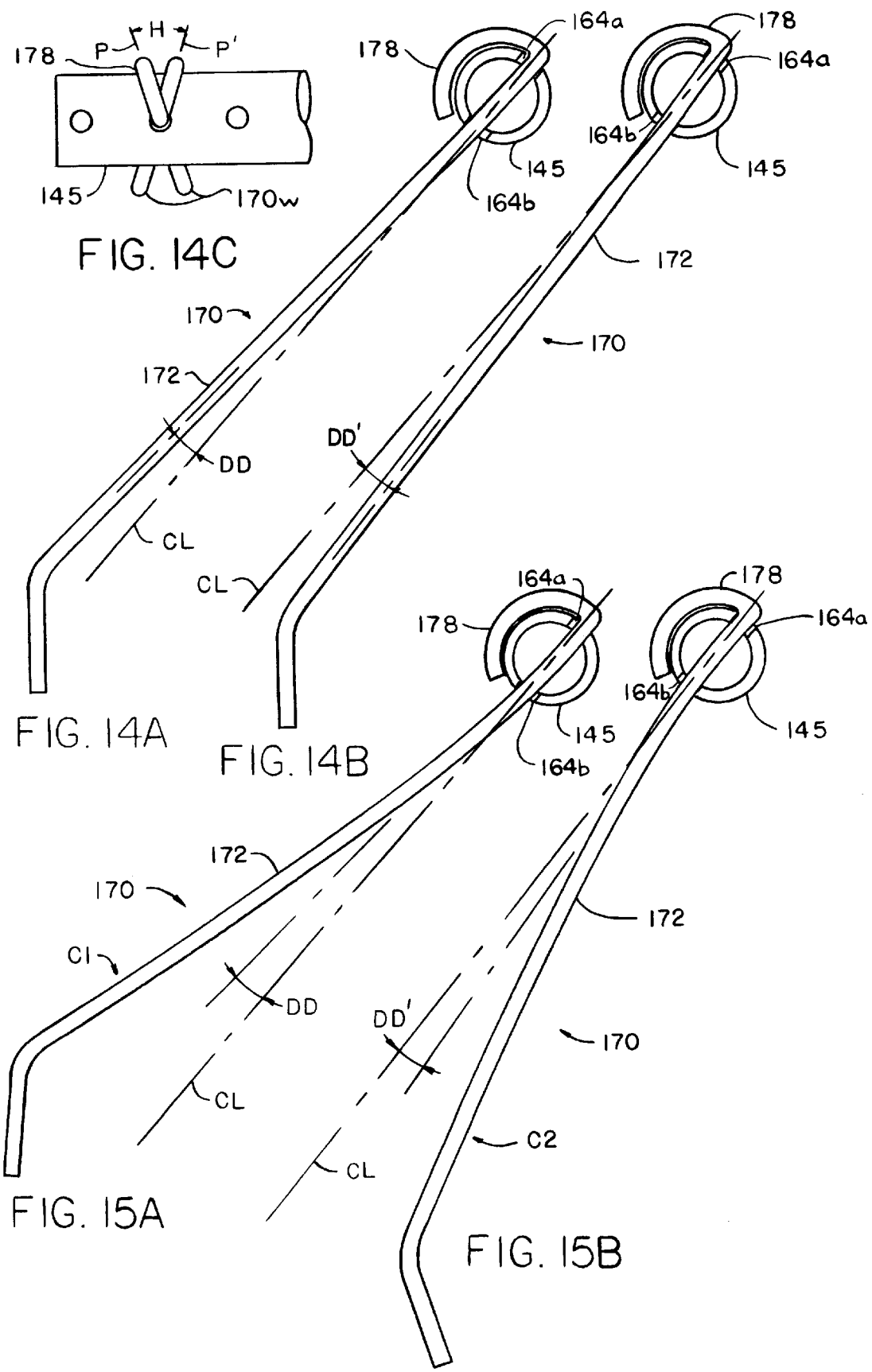

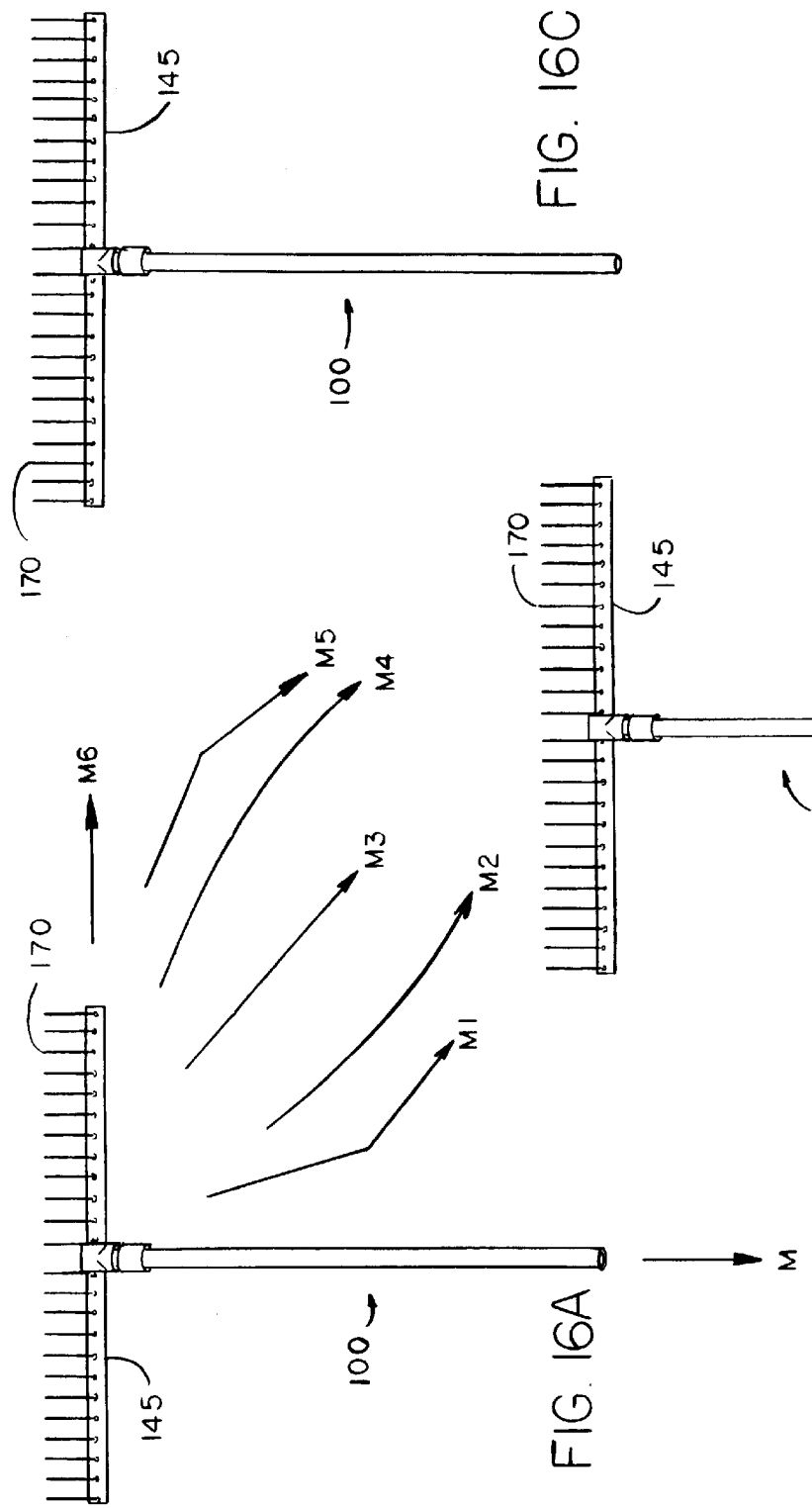

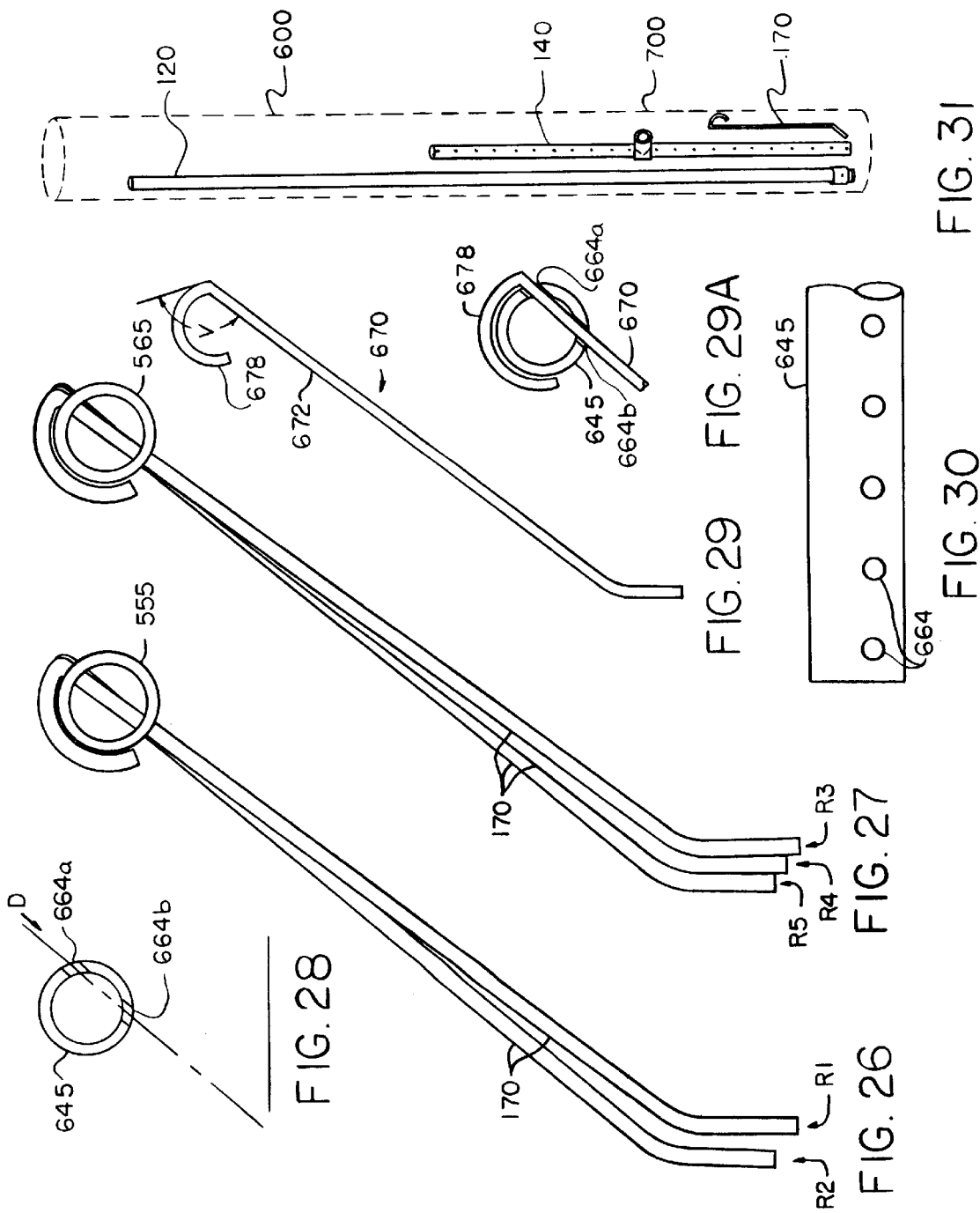

LAWN RAKE AND CROSS HEAD ASSEMBLY

BACKGROUND OF THE INVENTION-FIELD OF APPLICATION

The present invention is directed to lawn rakes in general and more particularly, lawn rakes having a cross head assembly with tines that are replaceable.

BACKGROUND OF THE INVENTION-DISCUSSION OF THE PRIOR ART

The following description and discussion of the prior art is undertaken in order to provide background information so that the present invention may be completely understood and appreciated in its proper context. The discussion is provided in terms of specific prior art references and an overview of trends that have developed within the art of broom-style lawn rakes that have tended to limit the effectiveness of lawn rakes.

The prior art of broom-style lawn rakes clearly shows an early period where a cross head assembly or cross head was a defining element of the lawn rake, leading to the period where a rake head assembly or rake head became a defining element. The defining element of a cross head assembly or cross head is a transverse member fixed to the end of a handle, with the tines arranged along and extending away from, the transverse member. The tines are generally parallel to one another and perpendicular to the transverse member. The defining feature of a rake head assembly or rake head, as taught by the prior art, is a fan-shaped or triangular shaped assembly of tines, diverging radially away from a fixed point at the end of the handle. While true cross head type rakes dominated the early prior art, a transition took place which embodied the transverse member with curvature. Further development of the art resulted in the rake head type rakes that prevail in the recent art.

As early as U.S. Pat. No. 566,048 issued Aug. 18, 1896 to A. Woeber for a "Rake or Broom," the indicated rake shows a cross arm through which the tines passed to meet and join at a grooved, segmented head. Already this reference is teaching that one end of the tines can serve the purpose of gathering leaves while the other end merges together with other tine ends to form a structural framework and anchoring. This teaching is contrary to a true cross head which has the sole function of structurally mounting and supporting each tine, while each tine has the sole function or gathering and collecting leaves and lawn debris.

U.S. Pat. Nos. 1,614,385 issued Jan. 11, 1927 to M. W. Otto for a "Rake," 1,621,276 issued Mar. 15, 1927 to F. E. Richardson for a "Rake," 1,735,237 issued Nov. 12, 1929 to E. L. Dennis for a "Garden Tool," 1,831,009 issued Nov. 10, 1931 to H. G. Kimber for a "Rake," 1,933,636 issued Nov. 7, 1933 to A. Montan for a "Rake," 1,942,629 issued Jan. 9, 1934 to W. Withington for a "Broom Rake," and 1,970,616 issued Aug. 21, 1934 to A. Montan for a "Rake," are all examples of cross head construction. All of these rakes have a relatively complicated cross head structure. All have metallic cross heads and metallic tines. Two more recent cross head art patents are U.S. Pat. No. 4,376,367 issued Mar. 15, 1983 to Elias L. Rocquin for a "Rake," and U.S. Pat. No. 4,649,698 issued Mar. 17, 1987 to Neil. Sykora for a "Lawn Rake." Both of these patents also rely on complicated metallic assemblies. Thus, it is apparent that the cross head art never made a transition to plastic materials that was accomplished in the transition of rake head assemblies having a large number of individual metal tines and other components connected together, to a simple, single-piece, injection molded plastic rake head with integral tines. The cross head art consequently did not take advantage of the lower densities of plastic materials that enable much lighter rakes. Undoubtedly, the ability to create a single-piece rake head was a driving force in the transition to plastic. At the same time the inability to create a single-piece cross head forestalled any attempts to move to plastic in cross heads.

The Rocquin patent and Sykora patent also both cite replaceability of tines as a salient feature, but the replaceability is achieved by complex arrangements requiring customized machining and metalforming of components. The Rocquin and Sykora patents, like others listed above, also rely on channel-like metal cross arms that increase weight and are difficult to manufacture. In addition, the method of assembling the handle to the cross arm requires a metal custom-made piece attached to the cross arm to receive the handle.

The cited Richardson patent is a further specific example of why cross head art evolved into rake head art, at the same time illustrating a deficiency in rake head art. Richardson indicates in the specification that the slots to receive the tines ". . . may be arranged in lines parallel with the broom handle . . . ," but admits that the drawing figures show them arranged in lines diverging from the handle. With the tines parallel to the handle, the width of the rake is limited to the width of the cross head. By making the cross head with the tines divergent, the raking width of the rake can be increased beyond the width of the cross head, thus increasing raking capacity. When carried to its ultimate by the prior art, a rake head assembly evolved, with the tines radiating and diverging from a common point.

This approach does increase raking capacity. The process was driven by the use of metal components which significantly increased the weight of a rake to increase its capacity. However, tines which diverge in any manner introduce a significant structural disadvantage. When drawn across the ground, divergence of the tines causes an eccentric or unbalanced loading to be placed on the tines which makes the rake difficult to control and can shorten the useful life of the tines. Tines which diverge the most, experience the greatest eccentric loading. In addition, the outside tines may be longer, thus more flexible, and thus less effective in raking leaves.

The rake head type rakes partially solved this problem by an intermediate cross member generally parallel to the ground and located between the handle and the tine ends. This cross member stiffens each tine by tying all tines together to provide lateral stability to each tine. This member adds complexity to the lawn rake and usually requires a separate stiffening spring to function properly. U.S. Pat. No. 5,022,221 issued Jun. 11, 1991 to David R. Bonnes and Philip J. Male for a "Lawn Rake with Improved Spring Anchoring," is a recent example of the efforts to provide an intermediate member to stabilize and control flexing of tines. Such arrangement inherently reduces and even eliminates the capability for replacing tines.

With a cross head, tines which instead are parallel to the handle bend primarily within the plane of the tine. That is, the tines undergo single axis bending for straight-ahead raking, minimizing torsional bending. Each parallel tine also generally experiences the same loading. The limiting factor for the raking capacity of a lawn rake with a cross head then becomes a simple matter of the width of the cross head, which in turn is limited only by the weight and strength of the transverse member which forms the cross arm. The metal channel-like cross arms utilized extensively in the prior art did not maximize strength-to-weight ratios which is essential for a cross head type lawn rake with a wide width, and which can be achieved with a cross arm made from a tube that has a closed cross section.

The tines of the Dennis patent are cited as replaceable, but the metallic nature of the tines suggests considerable pressure is required for their release and replacement. The tines of the Montan patent, U.S. Pat. No. 1,933,636, are disclosed to be of a self-locking type but it is not clear again whether the tines are removable. The Withington patent refers to removable tines made from spring steel having notches to lock the tines in position. Any notch of this type is a point of incipient weakness and failure. Furthermore, any deformation of the tine, at the notch or elsewhere, would render the tine difficult, if not impossible, to remove from the slots of the cross head. The cross head is of a metallic channel configuration arcuately bent to position the tines in a diverging fashion. The forming of the cross head requires additional steps in the manufacturing process that increases cost.

A rake having a cross bar and highly flexible spiral coiled tines is described in U.S. Pat. No. 2,095,693 issued Oct. 12, 1937 to H. E. Fuller for a "Rake." It appears the tines of this rake have too much flexibility and the art may have been better served if the coil of each tine wrapped around the cross bar instead of floating freely with only the tine end secured. Fuller's later patent, U.S. Pat. No. 2,302,541 issued Nov. 17, 1942 for a "Lawn Broom," appears to be an improvement over his earlier spiral tine. The method of securing the integral pairs of the tines provides greater lateral stability. However, the overall functionality of the tines under arduous raking conditions is still question able due to the coiled nature of the tine.

U.S. Pat. No. 2,075,220 issued Mar. 30, 1937 to S. P. Neuhausen for a "Rake," discloses a channel cross head having apertured flanges with the tines arranged in integral pairs. The tines however, must be held in position by a continuous rod which engages all of the tines. Thus, the tines are not easily removable and clearly not individually removable. J. L. Owen in U.S. Pat. No. 2,156,480 issued May 2, 1939 for a "Rake," shows a rake with tines that diverge outwardly except for the two central tines which converge inwardly. The tines are all of the same length, and thus are interchangeable in addition to being removable as described. As in the Fuller patent, however, a rod must be disengaged from the tines in order to achieve removability of each tine.

U.S. Pat. No. 2,850,865 issued Sep. 9, 1958 to E. B. Anderson for a "Lawn Rake," is directed to a lawn rake with a U-shaped cross bar having apertures in each cross bar flange aligned transversely. The spring steel tines are individually inserted into the aligned holes, with the coiled end of the tines frictionally engaging the cross bar by a snap fit. The tines are thus individually removable. Once again the cross bar is a channel-like member having an open cross section that is structurally inefficient. Furthermore, the frictional engagement of the tines, or the solidly attached engagement seen in other patents, raises the question of how the long unbraced length of the tines can withstand arduous raking without being bent or broken, especially when coming in contact with an object on the ground such as a stone.

With the flat tines employed in the Anderson patent and many other cross head patents, the weak axis of the tines is oriented in the direction of raking. The fixed connection of the tines to the cross bar also creates high stress where the tines are attached to the cross bar since the tines are behaving as a cantilevered beam having a fixed, moment resisting support. The highest stress in the tines then occurs where the tines are fixedly attached to the cross bar. There is a need to decrease the stress in the tines at this point by either increasing the strength of the tines in the direction of raking, or by decreasing the bending moment that the tines experience at the juncture with the cross bar, or a combination of both.

The Rocquin patent, referenced earlier, describes a lawn rake with a cross arm and individually replaceable tines. Rocquin makes the point that tools are not required to replace a tine. Nevertheless, a retaining strip is required to secure each tine in place. It is entirely conceivable such a retaining strip can be dislodged and lost amid a pile of leaves during raking. Loss of a retainer would reduce the effectiveness of the rake the same as if a tine broke. However, with the loss of the retainer, the tine could not be replaced, defeating a main object of the invention.

An early patent, U.S. Pat. No. 567,129 issued Sep. 8, 1896 to L. Gibbs for a "Rake and Apparatus for Making Same," discloses a method of manufacturing tubular rake heads. In this case a strip of sheet steel is punched with pairs of holes, the strip bent into a U-shape, tines inserted through aligned pairs of holes, and the U-shape further bent into a round tube. The tines become permanently and fixedly attached to the cross head during this process, due to the mechanical locking provided by the last bending. This method is intensive of special tools and dies, and does not render the tines replaceable. The slit that remains in the tube after bending results in the tube having a cross section which is not closed, thereby significantly reducing the strength of the cross head.

Another limiting factor in the development of a more efficient lawn rake, either cross head or rake head, has been the inability of a rake to be manipulated with a sideways component of motion. Thus, raking has been effectively restricted to straight-ahead raking action. The cross head art that has been cited does include references to tines having a circular cross section. Tines which have a circular cross section are uniformly flexible in all directions. However, the trend of recent art has been to use rectangular tines with intermediate stiffening ribs, or with intermediate stiffening ribs and stiffening springs. The Bonnes and Male patent cited earlier is a good example.

This trend started with the use of spring steel having a rectangular cross-section in order to minimize the connection problem at the point of convergence of the tines, for a fan-shaped rake. The rectangular cross-section then migrated to the single-piece, injection molded rake head. With rectangular tines the wide part of the tines is oriented parallel to the head of the rake. The tines are therefore far stiffer in a direction parallel to the rake head, than perpendicular to it Hence, raking action naturally advances only perpendicular to the rake head. Intermediate stiffening ribs reinforce this limitation. Lateral, or sideways, or swirling, or circular movement of the rake is made prohibitively difficult as long as the tines are in contact with the ground.

The cited cross head art that did utilize tines having a circular cross-section, also relied on fixed termination of the end of each tine not in contact with the ground. With such a fixed connection, tines that are deflected sideways undergo torsional bending, as well as bending in two planes. As said by Jonas Leander Owen in U.S. Pat. No. 2,156,480 issued May 2, 1939 for a "Rake," " . . . the tines in both forms of construction are continually secured against shifting in all directions and can neither turn nor shift laterally . . . ". This same condition has propagated throughout the art, showing the effort that has been made to always fixedly resist all applied forces. The success of this effort has severely limited the flexibility and ease of use that can be exploited by alternative constructions.

Thus, it can be seen that the prevailing trend in the art has gone from cross head art with metal tines having either a circular or rectangular cross-section, to rake head art with metal rectangular tines, to rake head art having rectangular tines integrally molded into a single-piece injection molded rake head. For all of the above reasons, it is apparent the prior art has not been able to provide a lawn rake having a cross head assembly that is simple to manufacture, makes use of parts that do not have to be entirely custom made, minimizes the number of parts, minimizes the loading conditions of the tines, and makes use of plastic materials. Furthermore, the prior art also has not explored the use of individually installed and replaceable plastic tines, or the use of tines that are loosely mounted on the cross arm or cross bar, allowing freedom of movement that tends to minimize stresses in the tines during raking. The prior art also has not explored the use of tines that are self-releasing from the cross arm during raking action under predetermined loading conditions, to minimize possibility of breakage. The prior art has not investigated whether a plastic cross head with individual plastic tines can be utilized since the prior art had already shifted to the rake head assembly and rake head style of rakes by the time plastic became established as a material of choice. With this discussion, the following objects of the invention are set forth.

OBJECTS OF THE INVENTION

It is thus an object of this invention to provide a lawn rake having a cross head assembly with individual plastic tines.

It is therefore an object of this invention to provide a lawn rake having a cross head assembly with plastic tines that are individually installable, individually removable, individually replaceable, and that require only the force of a finger to remove and install.

It is also an object of this invention to provide a cross head assembly constructed of plastic materials, except for fasteners.

It is yet another object of this invention to provide a lawn rake with tines that are self-releasing under predetermined loading conditions during raking action.

It is also an object of this invention to provide a cross head assembly with apertures that loosely position tines on the cross arm.

It is a further object of this invention to attach individual tines to a cross arm in a manner that is not rigidly secured, and that is not fixed.

It is an additional object of this invention to provide tines that have freedom of movement on the cross arm, thereby minimizing stresses in the tines during raking action.

It is still another object of this invention to provide a lawn rake that is lightweight, simple to manufacture, durable, and inexpensive.

It is still another object of this invention to provide a cross head assembly with a structurally efficient cross arm in the form of a closed tube.

It is nevertheless another object of this invention to allow tines freedom of movement to align with the direction of raking motion of the lawn rake.

It is therefore another object of this invention to pivotally mount tines on the cross arm of a cross head assembly.

It is yet another object of the invention to make use of readily available components to manufacture a lawn rake, thereby minimizing custom tooling and machining.

It is yet another object of this invention to make use of readily available thermoplastic components to manufacture a cross head assembly.

It is also an object of this invention to provide a lawn rake with individual tines having a circular cross section and made from a thermoplastic material.

It is also another object of this invention to provide a new and novel rake that includes a cross head assembly.

It is another object of this invention to provide a lawn rake that requires a minimal amount of space for storage, shipment, and transport.

It is also an object of this invention to provide a lawn rake that can be disassembled into separate components of handle, cross head and tines.

It is an additional object of this invention to provide plastic tines on a lawn rake that snap into place to retain themselves on the cross arm.

It is another object of this invention to provide a cross head assembly with tines having a looped bend that serves to engage the outside surface of the cross arm to install and retain a tine on the cross arm.

It is nevertheless another object of this invention to provide a lawn rake including a cross head assembly, that can be distributed and sold in kit form.

It is still a further object of this invention to provide a lawn rake that is easier to use and more efficient in the movement of leaves and lawn debris.

It is a further object of this invention to provide a lawn rake with a cross head assembly that can be used in a push mode for moving piles of leaves as well as pull mode for raking leaves.

It is still another object of this invention to manufacture the components of a lawn rake having a cross head assembly, except for fasteners, from the thermoplastic material polyvinylchloride.

It is thus another object of this invention to provide a lawn rake that can be utilized with sideways motion, swirling motion, or circular motion, or any motion having a component of movement parallel to the head of the rake.

These objects and other aspects and advantages of the present invention will become readily apparent from the following description and claims, particularly when considered in conjunction with the accompanying drawings.

SUMMARY OF THE DISCLOSURE

The present invention is directed to a species of broom-style lawn rakes defined by a cross head assembly. The cross head assembly is attached to the end of a handle. The cross head assembly further includes a transverse cross arm and a plurality of tines. A truncated tee can be mounted on the tubular cross arm and connects the cross head assembly to the handle. The tines are individually replaceable. Each tine is a self-contained element that has a looped bend formed in the end of the tine opposite the ground engaging tip. The looped bend may form an arc segment of a circle. The tines are mounted onto the cross head be insertion through pairs of aligned apertures. The looped bends of the tines snap into place around the cross arm which retains them of the cross arm, with the apertures holding the tines loosely in place in side-by-side spaced alignment.

The plurality of tines so attached forms an array. The array may be substantially coplanar. The tips of the tines may be so arranged that tip spacing is uniform. Uniform tip spacing may require the medial tines, each adjacent one side of the truncated tee, to converge towards one another. The tines adjacent the two medial tines then must have closer spacing than the remainder of the tines in order to achieve uniform tip spacing.

For an array that is substantially coplanar, the pairs of apertures are colinearly aligned parallel to the axis of the cross arm. Pairs of apertures that are diametrically opposed may assume other configurations that result in two or more alternating rows of tines, or that result in arrays that are curvilinear.

The paired apertures in the cross head are oversized to permit insertion and removal of the tines by finger force and to loosely hold the tines in position on the cross arm. The tines are preferably made from a thermoplastic material to provide flexibility for raking action as well as the necessary flexibility to distend as they are inserted or removed through the paired apertures. The tines may have a circular cross section, as may the apertures. The cross arm and truncated tee may be made from the same class of materials as the tines. The plane of the array of the tines generally subtends an obtuse angle with respect to the handle, but embodiments may be coplanar with the handle. The tines, transverse cross arm, and truncated tee may all be made from the thermoplastic material, polyvinylchloride. In conjunction with a polyvinylchloride handle, the lawn rake may thus be made from one material except for fasteners. Embodiments may include tines that have a flat, rectangular cross section, and/or tines that are metallic, and/or a cross arm that is metallic.

The tines do not require fasteners, clips, or retainers to stay in place or maintain their general position during use of the lawn rake. The tines are, furthermore, releasable during raking action. The oversized apertures allow is freedom of movement of the tines, reducing the moment resistance of the connection of the tines to the cross arm. Thus, stresses in the tines are reduced, greatly minimizing the chance of tine breakage. In the course of raking action, a tine may be subjected to axially directed forces on the end such as might occur when a tine hits a rock when the rake is placed to commence raking action. The oversized apertures, together with the non-rigid, non-fixed, and non-frictional mounting of the looped bend on the cross arm, allow the looped bend to unsnap from engagement with the cross arm, releasing the tine without breaking. However, the tine can be prevented from shooting out of the cross arm. An obtuse angular bend in the tine proximate the ground engaging tip, may serve the purpose of preventing the tine from passing completely through the pair of apertures without application of at least one more force. Thus, the tines are removable, energy absorbing, and releasable.

Even though the tines have considerable lateral flexibility, when the tines are engaged with the ground in raking action, the tines all tend to deflect to the same extent in the same direction, at the same time. Alignment is maintained by the looped bend in each tine which wraps around the cross arm with freedom of movement both perpendicular and parallel to the cross arm. The freedom of movement allows the tines to better withstand loading conditions during the normal course of raking. At the same time, the shifting of the looped bends permits the tines to stay generally aligned in the direction of raking action. Tines that have a circular cross section, together with pivotal mounting of the tines on the cross arm, allow raking action that is laterally directed or arcuate in motion, or that has quick changes in direction, all while the lawn rake remains in contact with the ground.

When the tines are in contact with the ground and deflected during raking action, the back side of each tine is generally in contact with the back edge of its bottom circular aperture. When the tines are released from the ground, the oversized apertures allow the tines to spring forward so that the front of the tines snap against the front of the bottom circular apertures. This snapping action transmits more kinetic energy to the leaves and lawn debris than would occur if the tines merely unbend from their deflected raking position, without a freedom of movement at their mounting as allowed by the oversized apertures.

The tines retain all of the normal functions of gathering and collecting leaves and lawn debris that other rakes provide, in addition to the improvements noted above. The lawn rake embodies an additional, new method of operation by allowing the capability of pushing piles of accumulated leaves and lawn debris. When utilized in the push mode, the tines bend in a direction opposite to the direction in which the tines bend when the lawn rake is used in a conventional raking mode. This capability is inherent in the lawn rake embodiment having a cross head assembly subtending an appropriate obtuse angle with respect to the handle.

The entire rake can be disassembled so that it has the capability of being distributed as a disassembled kit of parts within a relatively compact shipping container such as a mailing tube.

It is understood that both the foregoing summary and the following detailed description are exemplary and explanatory only, and are not restrictive of the invention, as claimed.

BRIEF DESCRIPTION OF THE DRAWINGS

In the drawings, closely related figures of a like grouping are given the same number but different alphabetic suffixes.

FIG. 1A is a fragmented perspective view of the cross head of the lawn rake shown in FIG. 1;

FIG. 9 is a perspective view of the truncated tee;

FIGS. 10A–D are respectively, front elevation, side elevation, top plan, and bottom plan views, of the truncated tee;

FIG. 10E is a vertical section view of the truncated tee, taken along section lines E—E in FIG. 10A;

FIG. 10F is a side elevation view of the truncated tee mounted on the cross arm, with the tines omitted for ease of illustration;

FIG. 11 is a vertical section view of an alternative truncated tee;

FIGS. 10A–F and FIG. 11 show views of the truncated tee as though it were positioned vertically, for ease of illustration;

FIG. 12A shows engagement of a tine on the cross arm by application of finger force;

FIG. 12B shows the position of the tine of FIG. 12A just prior to snapping into place around the cross arm;

FIG. 12C shows release of a tine from the cross arm by application of finger force;

FIGS. 13A–F show the sequence of steps to cause removal of a tine from the cross arm;

FIGS. 14A and B illustrate sequentially, the front-to-back limits of movement of a tine mounted on the cross arm;

FIG. 14C illustrates the side-to-side limits of movement of a tine mounted on the cross arm;

FIGS. 15A and B illustrate sequentially, representative front-to-back movement and bending of a tine mounted on the cross arm caused by raking action;

FIGS. 16A–C are top views of a lawn rake incorporating the present invention, illustrating directions of movement during raking action;

FIG. 21 B is a partial bottom view of the cross head of the alternative cross head assembly of FIG. 21;

FIG. 26 is a side elevation view of the cross head of FIG. 24, showing the tines mounted thereon, with the truncated tee omitted for ease of illustration;

FIG. 27 is a side elevation view of the cross head of FIG. 25, showing the tines mounted thereon, with the truncated tee omitted for ease of illustration;

FIG. 28 is a cross-sectional view of an alternative cross arm showing apertures that are not diametrically opposed;

FIG. 29 is a side elevation view of a tine usable with the cross arm of FIG. 28;

FIG. 29A is an enlarged view of the looped bend of the tine shown in FIG. 29, showing engagement with the cross arm;

FIG. 30 is a partial top view of a cross arm having apertures that are not diametrically opposed, looking in the direction D of FIG. 28; and FIG. 31 is a perspective view of a cylindrical mailing container showing disposition within of the handle, cross head, and tines of a lawn rake of the present invention.

DESCRIPTION OF THE PREFERRED AND ALTERNATIVE EMBODIMENTS

Figure 1:
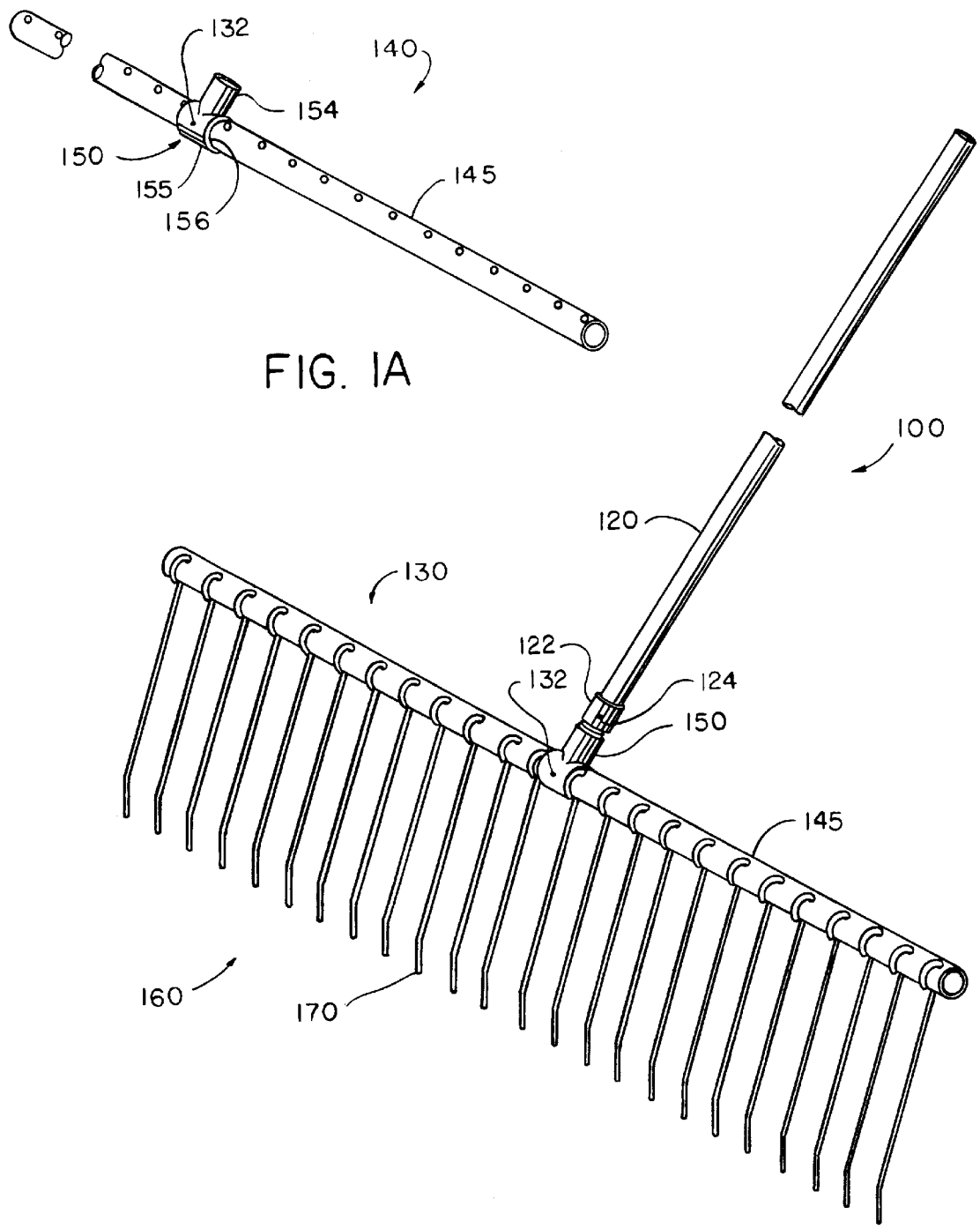
FIG. 1 is a perspective view of a lawn rake incorporating the present invention, with the handle shown fragmented.

With reference to the drawings, there is generally shown in FIG. 1 a lawn rake 100 including a handle 120 and a cross head assembly 130. Lawn rake 100 s performs a conventional function of raking leaves and lawn debris, as well as an additional function of pushing piles of accumulated leaves and lawn debris. Cross head assembly 130 includes a transverse cross arm 145, a truncated tee 150, and an array 160 of tines 170. Array 160 shows tines 170 substantially coplanar, arranged in side-by-side, parallel spacing.

In FIG. 1A a cross head 140 is shown comprising cross arm 145 with truncated tee 150 mounted thereon. Truncated tee 150 includes a socket portion 154, and a barrel portion 155 having an internal cylindrical surface 156. Truncated tee 150 slides on to an end of cross arm 145. Truncated tee 150 engages cross arm 145 by means of a frictional fit acting at the contact surface areas of internal cylindrical surface 156 of tee 150 and the external cylindrical surface of cross arm 145. Truncated tee 150 is medially located on cross arm 145 with socket portion 154 for receiving handle 120. Truncated tee 150 is permanently secured to cross arm 145 by one or more fasteners 132 which may be one or more rivets, screws, bolts, pins, or any other appropriate fastener. Only one fastener is shown in FIGS. 1 and 1A and its location is representative of many possible locations around barrel portion 155 of truncated tee 150.

Handle 120 may be an elongated tubular member or an elongated solid rod composed of any material established by the prior art as suitable for the handle of a lawn rake. In particular, handle 120 may be composed of a thermoplastic material, or specifically the thermoplastic material polyvinylchloride. Handle 120 may be equipped with an end cap that is attached frictionally, with glue, or with a fastener such as a rivet.

Handle 120 may connect to socket portion 154 of truncated tee 150 by any number of means established in the prior art. As shown in FIG. 1, an adaptor 122 is attached to an end of handle 120. Adaptor 122 may be a thermoplastic fitting having an internal socket portion for engaging end of handle 120 by a fricitional fit, permanently secured by one or more fasteners 124 which may be one or more rivets, screws, bolts, pins, or any other appropriate fastener. Only one fastener is shown in FIG. 1 and its location is representative of many possible locations around adaptor 122. Adaptor 12 has external threads for threadable connection to socket portion 154 of truncated tee 150, it being understood that socket portion 154 has matching internal threads to receive adaptor 122. Socket portion 154 may also threadably receive handle 120 directly, it being understood that external threads are provided on the end of handle 120, and matching internal threads are provided in socket portion 154, for the threadable connection. Socket portion 154 may also insertably receive handle 120 by either a permanent connection or a releasable connection. For a permanent connection, socket portion 154 receives handle 120 by a frictional fit, and is secured by a fastener such as a bolt and nut, or a locking pin, or secured by one or more rivets. For a releasable connection, socket portion 154 receives handle 120 by a slip fit, secured by a fastener such as a bolt and nut, or a locking pin.

Figure 2:
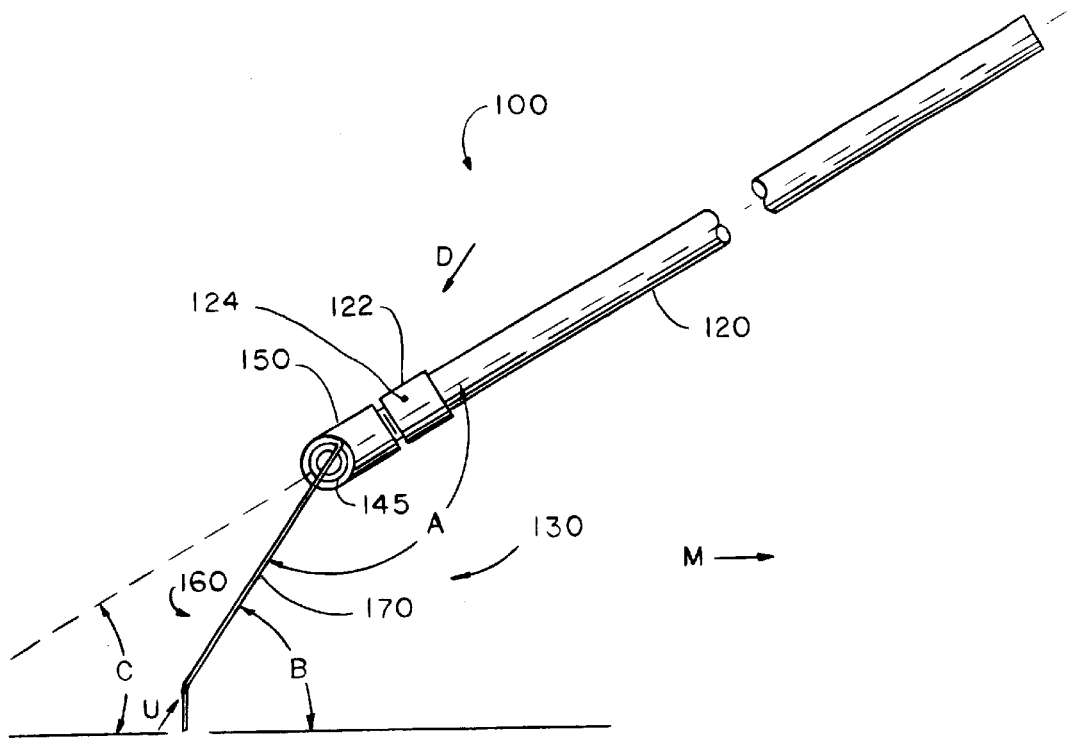
FIG. 2 is a side elevation view of the lawn rake shown in FIG. 1.

In FIG. 2, lawn rake 100 is shown in side elevation, further illustrating the generally coplanar arrangement of tines 170 to form array 160. An obtuse angle A is shown subtending handle 120 and array 160. Angle A provides the benefit of increasing the size of the cavity that forms between array 160 and an expansive surface such as the ground or a lawn. For efficient performance of lawn rake 100 in raking action, angle A ranges from approximately 130° to 170°. An angle B subtends array 160 and the expansive surface. An angle C subtends the extension of the centerline of handle 120 and the expansive surface. Due to the geometry established by obtuse angle A, angle B is necessarily larger than angle C, The leaf and lawn debris containing cavity of lawn rake 100, defined by angle B, is thus larger than the cavity obtained if array 160 is substantially coplanar with handle 120, forming a cavity defined by angle C. Of course, angle B may equal angle C if so desired, in which case cross head assembly 130 is substantially coplanar with handle 120. A direction of movement M denotes the movement of lawn rake 100 in a conventional manner for raking leaves and lawn debris.

In addition, leaves and lawn debris have an angle of repose since the leaves and lawn debris constitute a loose, free standing material. As a result of the configuration of cross head assembly 130 created by angle A, and angle B, array 160 does not tend to ride up and over an accumulated pile of leaves and lawn debris, as is the case with a fan shaped rake head that is substantially coplanar with the handle. Instead array 160 is able to compress and cut into an accumulated pile of leaves and lawn debris. Cross head assembly 130 is then able to penetrate the pile of leaves and lawn debris and provide further forward urgement to the leaves and lawn debris. Obtuse angle A is obtainable from the unique structure of cross head assembly 130 as described below. The value of angle A is not limited by any structural considerations of lawn rake 100. Angle A is solely determined by the most efficient and productive raking action that can be accomplished with lawn rake 100.

Figure 3:
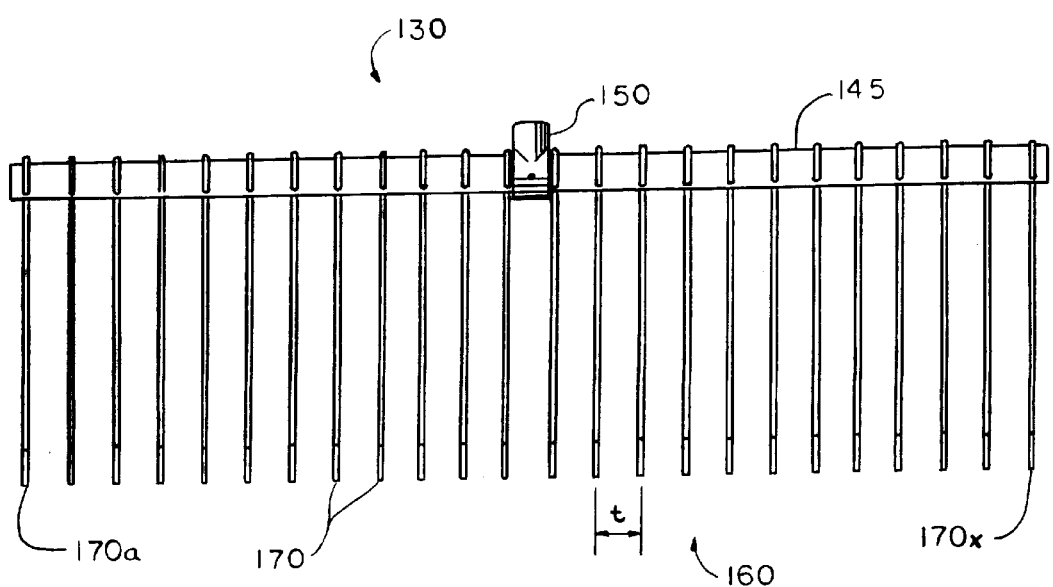
FIG. 3 is a front elevation view of the cross head assembly.

Cross head assembly 130 is generally shown in FIG. 3, further showing the medial location of truncated tee 150 on cross arm 145. Also shown is the parallel side-by-side spacing of tines 170. For cross head assembly 130, the width of truncated tee 150 is a value such that uniform parallel side-by-side spacing of tines 170 can be accomplished. A tip spacing t is selectable based on the raking efficiency desired for lawn rake 100. Parallel side-by-side spacing of tines 170 generally results in tip spacing t of about ⅞ of an inch center-to-center for efficient performance of lawn rake 100. Tines 170 include an end tine 170a and an end tine 170x. Other tip spacings may be selectable to vary the performance of lawn rake 100.

Figure 4:
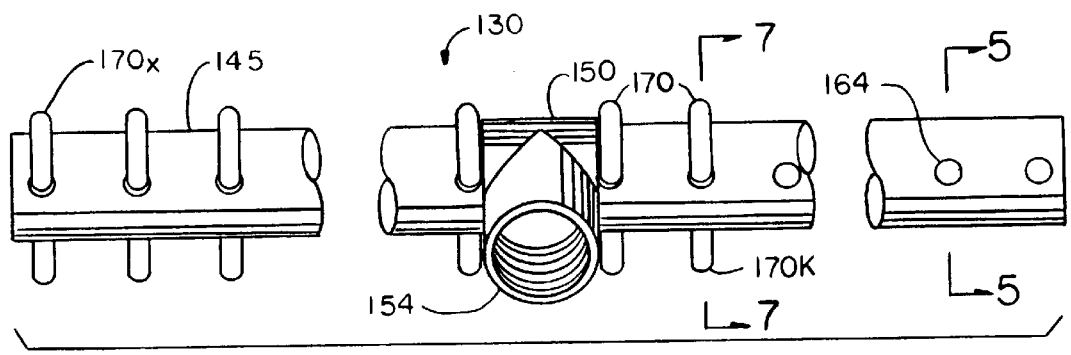
FIG. 4 is a fragmented top view of the cross head assembly shown in FIG. 3, looking down along the tine stems, with some tines omitted for ease of illustration.

A top view of cross head assembly 130 taken in the direction D of FIG. 2, is shown in FIG. 4. Cross arm 145 is shown as a transverse member with truncated tee 150 including socket portion 154. Cross arm 145 comprises an elongated tubular member having a plurality of pairs 162 of diametrically opposed circular apertures 164 arranged in a colinear manner. Only one aperture of each pair 162 is shown in FIG. 4. For ease of illustration, tines 170 are only shown engaging some of apertures 164. Insertion of tines 170 through apertures 164 results in array 160 being substantially coplanar. Cross arm 145 is composed of tubular material that provides uniform structural strength to cross head assembly 130 in all directions for resisting bending loads applied to cross arm 145. Uniform structural strength is achieved by the radial symmetry of cross arm 145 having a closed cross section everywhere except at apertures. The strength of cross arm 145 is diminished minimally by the presence of apertures 164. Cross arm 145 also provides anchoring and support for tines 170.

The tubular material may be a thermoplastic material. The thermoplastic material may be fiber reinforced or fiberglass reinforced. In particular, the thermoplastic material may be polyvinylchloride. The polyvinylchloride material may be fiber reinforced or fiberglass reinforced. More particularly, the polyvinylchloride material may be the commonly available, commercially mass produced, polyvinylvhloride plumbing pipe. Alternatively, the tubular material may be a metal such as steel or aluminum, or the tubular material may be fiberglass. The width of cross arm 145, and thus of cross head assembly 130, is limited only by the requisite rigidity of cross arm 145 to effectively perform raking action, by the weight of cross head assembly 130, and by the ability of the user to manipulate lawn rake 100.

Figures 5, 6, 7, 7A:
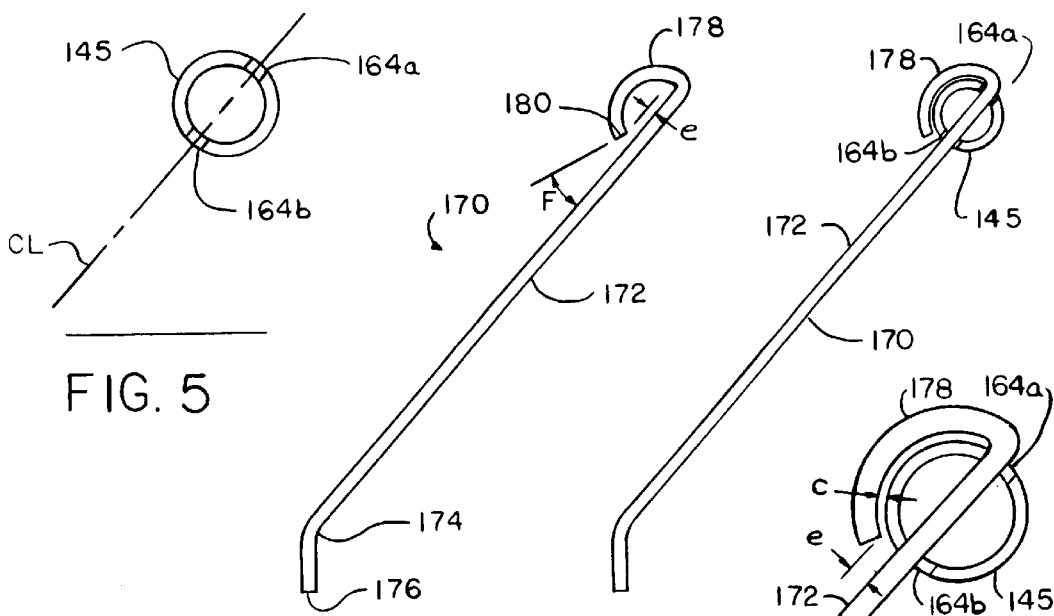
FIG. 5 is a cross-sectional view through a pair of apertures in the cross arm, taken along section lines 5—5 in FIG. 4.
FIG. 6 is a side elevation view of a tine showing its component elements.
FIG. 7 is a cross-sectional view through a tine mounted on the cross arm, taken along section lines 7—7 in FIG. 4.
FIG. 7A is an enlarged view of the looped bend of the tine shown in FIG. 7, showing engagement with the cross arm.

FIG. 5 is a sectional view through cross arm 145 at apertures 164. A top aperture 164a and a bottom aperture 164b comprise pair 162 of apertures 164. Apertures 164 have a diameter larger than the diameter of times 170, for ease of insertion, for ease of removal, and for the releasability of tines 170, as will be described further. A centerline CL passes through the centers of apertures 164a and 164b. With lawn rake 100 in a leaf and lawn debris raking disposition, centerline CL generally falls along angle B in FIG. 2 that array 160 develops with the ground. The relative diameters of tines 170 and apertures 164 can be changed to vary the benefits of the present invention. Apertures 164 loosely position tines 170 on cross arm 145.

Elements of tine 170 are illustrated in FIG. 6. Tine 170 comprises a single piece of resilient material and includes a stem 172, and a looped bend 178 for engaging cross arm 145 by snap action. Looped bend 178 terminates in the tine end 180. Looped bend 178 may take the shape of an arc segment of a circle, with looped bend 178 having an inside diameter approximating the outside diameter of cross arm 145. Should the inside diameter of looped bend 178 be slightly smaller than the outside diameter of cross arm 145, looped bind 178 may contact cross arm 145 only at the point of tine end 180. Stem 172 further includes a bend 174. Tine 170 terminates in a ground engaging tip 176. With tine 170 positioned on cross arm 145, tip 176 is generally normal to the expansive surface upon which lawn rake 100 operates. Tine end 180 is generally perpendicular to the curvature of looped bind 178. An end gap e is a predetermined distance from tine end 180 to the nearest point of stem 172. An angle F is subtended by tine end 180 and stem 172.

Tine 170 has a solid, circular cross section. The diameter of tine 170 is less than the diameter of circular apertures 164. Tine 170 may be composed of a thermoplastic material. In particular, tine 170 may be injection molded from a thermoplastic material, which may specifically be polyvinylchloride. As an alternative, tine 170 may be formed from polyvinylchloride rod by heating and bending the rod to the appropriate configuration as shown in FIG. 6. Bend 174 may alternatively be mechanically bent without heat to form the appropriate predetermined angle. The diameter of the circular cross-section of tine 170 is related to the length of tine 170, and the physical properties of the material of which time 170 is composed. Polyvinylchloride rod having a diameter of approximately 3/16 inch provides efficient leaf and lawn debris raking action while minimizing breakage. Other diameters of tines 170 may be appropriate based on the length of tines 170 and the material of composition of tines 170. Tines 170 may alternatively be composed of a spring steel material having appropriate physical properties of strength and elasticity. The spring steel may have a cross section that is circular or that is flat and rectangular. As other alternatives, tines 170 may be made from fiberglass, fiber reinforced thermoplastic, or fiberglass reinforced thermoplastic, and have a circular cross-section or a flat, rectangular cross-section.

Apertures 164 may have a diameter of approximately ¼ inch in consideration of a diameter of tines 170 which is approximately 3/16 of an inch. Alternatively, top apertures 164a and bottom apertures 164b, may have diameters that differ. Apertures 164 may have other diameters, depending on the diameter of tines 170.

In FIG. 7 tine 170 is shown mounted on cross arm 145. The position of tine 170 within apertures 164 illustrates the larger diameter of apertures 164 compared to the diameter of tine 170. In FIG. 7A an enlarged view of looped bend 178 shows engagement with cross arm 145. A clearance c is the distance s between cross arm 145 and the inside diameter of looped bend 178. Clearance c is measured when stem 172 is in contact with that point of the circumference of both apertures 164a and 164b that produces the maximum value of clearance c. The force required to install or remove tine 170 from cross arm 145 is related to end gap e, clearance c, the stiffness of looped bend 178, and the difference in diameters of apertures 164 and tine 170. End gap e is a measure of the degree of mechanical anchorage of looped bend 178 on cross arm 145. Clearance c is a measure of the looseness of looped bend 178 on cross arm 145 and is necessarily related to the advantages obtained from apertures 164 having a larger diameter than tines 170. The effect of oversized apertures 164 operating in conjunction with looped bend 178 is to trap tine 170 loosely in position on cross arm 145. Tine 170 is thus attached to cross arm 145 in a non-rigid, non-fixed, manner, absent a sufficient force during raking action to cause release of tine 170 from cross arm 145, as will be explained later.

Clearance c may be as much as approximately one-half the difference in diameters of apertures 164 stem and 172. Clearance c may also be minimized such that looped bend 178 just barely touches cross arm 145 along the internal arc of looped bend 178. In the case of looped bend just touching cross arm 145, the resilience of the material of which tines 170 are made, does not allow frictional resistance to develop between looped bend 178 and cross arm 145 because of insufficient stiffness of looped bend 178. In addition, any upward force on ground engaging tip 176 tends to open up looped bend 178 to disengage it from cross arm 145 so that any contact frictional resistance is intentionally defeated. The benefits of this characteristic are illustrated and explained later.

Figure 8:
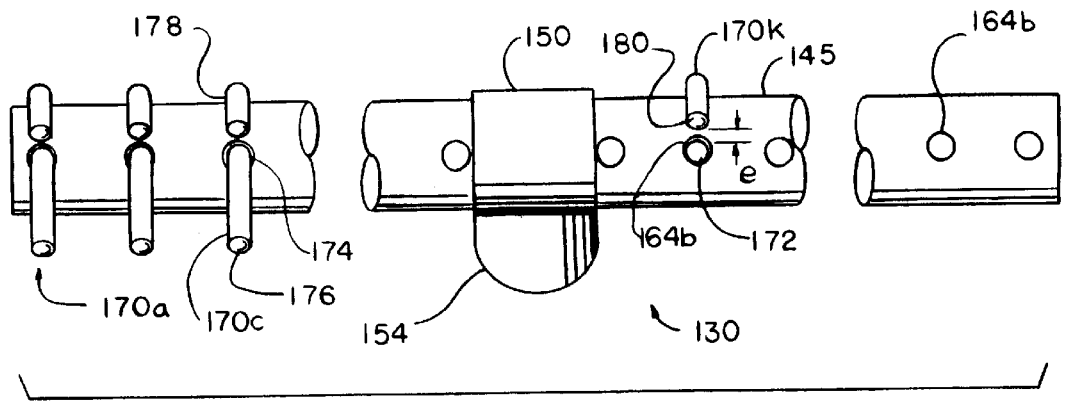
FIG. 8 is a fragmented bottom view of the cross head assembly shown in FIG. 3, looking up along the tine stems, with some tines omitted for ease of illustration.

FIG. 8 is a bottom view of cross head assembly 130 taken in the direction U of FIG. 2. A tine 170k is shown with bend 174 and tip 176 removed for illustration only. The circular cross-section of stem 172 is thus shown positioned within bottom aperture 164b with a resulting eccentric annular space around stem 172 where it passes through bottom aperture 164b. A similar eccentric annular space would be situated around stem 172 where it passes through top aperture 164a. Stem 172 generally is shown eccentric within apertures 164 due to the inherent looseness and play between tines 170 and apertures 164, which provide unique aspects of the present invention in terms of installation, removability, releasability, and energy absorption of tines 170. A uniform annular clearance around stem 172, or an eccentricity of stem 172 within apertures 164 that places stem 172 in contact with any part of the circumference of apertures 164a, 164b, or both, does not alter the benefits of the present invention. End gap e between tine end 180 and stem 172 is also shown in FIG. 8, as is the relationship of bend 178 of a tine 170c as it engages cross arm 145 from above and curls toward the bottom of cross arm 145.

In FIG. 9 there is shown a perspective view of truncated tee 150 by itself, in the approximate orientation it would take as mounted on cross arm 145. Truncated tee 150 is shown including its component elements barrel portion 155 having internal cylindrical surface 156, and socket portion 154. The width of barrel portion 155 approximates the outside diameter of socket portion 154. Tee 150 may be injection molded from a thermoplastic material. Tee 150 may particularly be molded from the thermoplastic material polyvinylchloride. Tee 150 may also be produced by cutting off the arms of the T-shape of plumbing fittings generally referred to as tees which may already be made from a thermoplastic material such as polyvinylchloride. These same plumbing tees may also require reaming to provide an internal diameter that enables tee 150 to slide onto cross arm 145 with a frictional fit.

Orthogonal views of tee 150 further illustrating its component elements are shown in FIGS. 10A–D. Tee 150 is shown in: front elevation in FIG. 10A, side elevation in FIG. 10B, top plan view in FIG. 10C, and bottom plan view in FIG. 10D. In FIG. 10C, internal cylindrical surface 156 is seen looking down socket portion 154, demonstrating the connecting internal space of socket portion 154 and barrel portion 155. FIG. 10E shows a sectional view of tee 150 taken from FIG. 10A, illustrating the internal threads of socket portion 154 to threadably receive handle 120. The frictional mounting of tee 150 on cross arm 145 is shown in FIG. 10F, illustrated by the line of contact shared by internal cylindrical surface 156 and the external cylindrical surface of cross arm 145. Also shown in FIG. 10F is a single fastener 132a consisting of a screw, located in a representative position different from fastener 132 in FIGS. 1 and 1A.

A vertical section through an alternative truncated tee 151 is shown in FIG. 11. Tee 151 differs from tee 150 by a reinforcing portion 157 that separates the internal space of socket portion 154 and the internal space of barrel portion 155. Reinforcing portion 157 provides additional strength and rigidity to tee 151. Tee 151 may be injection molded from a thermoplastic material, which may particularly be polyvinylchloride.

FIGS. 12A and 12B illustrate the installation of tine 170 by snapping tine 170 into place on cross arm 145. In FIG, 12A the application of finger force is all that is required to push tine end 180 up and over cross arm 145. As this is done, bend 178 opens up, storing elastic strain energy in bend 178. Once tine end 180 reaches the point of cross arm 145 where bend 178 opens the widest, as shown in FIG. 12B, the resilient elasticity of the material of which tine 170 is composed, causes release of the elastic strain energy, further causing bend 178 to snap into place around cross arm 145. During application of finger force, angle F allows tine end 180 to ramp up cross arm 145 by a wedging action, during installation of tine 170.

In a similar manner, as shown in FIG. 12C, once tine 170 is positioned on cross arm 145, finger force can be applied to tine end 180 to cause bend 178 to open up and be released from cross arm 145 for the purpose of removing tine 170. This action can be utilized to remove a particular tine and reposition it at another location on cross arm 145. For example, if an intermediately located tine of array 160 is broken, end tine 170a or 170x can be removed and relocated to the position of the broken tine. This allows raking action to quickly be continued without obtaining a replacement tine, which would otherwise be required to maintain uniformity of raking. Without the repositioned or replacement tine, a trail of leaves or lawn debris remains on the ground in the area of array 160 left vacant where the original tine was located, thus requiring additional raking effort.

In FIGS. 13A–13F the releasable operation of tine 170 during raking action is demonstrated along with the retractability and retainability of tine 170, and the energy absorbing ability of tine 170. In the same way that finger force applied to tine end 180 causes release of bend 178 from engagement with cross arm 145, application of an upwardly force on tip 176 can have the same effect. Such application of an upwardly force can occur during raking action if lawn rake 100 is placed in operation on an expansive surface that has a protruding object such as a rock or root. A protruding object is a common cause for distortion or breakage of tines on lawn rakes. If bend 178 engaged cross arm 145 fixedly, then application of an upwardly force on tip 176 can cause tine 170 to bend and break, particularly in the case of a plastic tine.

Instead, the releasability of bend 178, previously described with regard to intentional removal of tines 170 in FIG. 12C, allows the applied force to be transmitted along stem 172 without breaking tine 170. The transmitted force then acts upwardly on bend 178 where it meets stem 172, causing bend 178 to open and disengage from cross arm 145. The magnitude of the force required to release tine 170 from cross arm 145 depends on end gap e, clearance c, and the stiffness of bend 178. These parameters are selected, predetermined values such that the properties of the present invention are beneficially obtained. The object is to control the looseness of tine 170 on cross arm 145 such that tine 170 remains attached to cross arm 145 during normal raking action, but absorbs energy and releases from cross arm 145 upon application of predetermined loading conditions on tip 176 that might otherwise cause tine 170 to break.

The position of tine 170 instantaneously after application of an upwardly force on tip on tip 180 is shown in FIG. 13A. The application of the upwardly force may cause sudden release of tine 170 such that stem 172 is propelled through apertures 164 with tine 170 attempting to shoot out of cross arm 145. The physical configuration of tine 170 at bend 174 prevents tine 170 from completely disengaging from cross arm 145. Thus, tine 170 is retained on cross arm 145 in a released position, as indicated in FIG. 13A. Tine 170 can be reengaged on cross arm 145 by application of finger force, as earlier demonstrated in FIGS. 12A and 12B. Tine 170 has consequently avoided breakage that might otherwise occur as a result of impacting a protruding object.

Once tine 170 reaches the released position of FIG. 13A, at least one more force is required to completely remove tine 170 from cross arm 145. The diameter of apertures 164 has a predetermined value, as previously explained, such that tine 170 can displace upwards upon application of finger force on tine end 180, or upon application of an upwardly force on tip 176. The magnitude or duration, or both, of a force on tip 176 to cause complete disengagement of tine 170 from cross arm 145 is necessarily larger than the magnitude or duration, or both, of a force on tip 176 required to merely release bend 178 from engagement with cross arm 145.

With tine 170 in the position of FIG. 13A, removal of tine 170 from cross arm 145 first requires movement of bend 174 to the vicinity of bottom aperture 164b, as shown in FIG. 13B. Stem 172 proximate bend 174 must deform in order for bend 174 to pass first through bottom aperture 164b and then through top aperture 164a. The larger diameter of apertures 164, compared to the diameter of tine 170, together with the elastic properties of tine 170, allow the deformation to take place, and further allows the deformed configuration of stem 172 and bend 174 to pass through apertures 164. The deformation of stem 172 has the effect of providing sufficient temporary alignment to tine 170 proximate bend 174 such that oversized apertures 164 eventually allow tine 170 to completely disengage from cross arm 145.

The force required to completely remove tine 170 from cross arm 145 may be applied in one quick uniform motion. The configuration of tine 170 with relation to cross arm 145 as shown in FIG. 13F would then be obtained. However, application of the force can be further broke down into a series of discrete steps to further demonstrate the unique attributes of tine 170. Deformation of stem 172 in FIG. 13C is shown occurring above bend 174. A similar benefit accrues to the present invention if deformation takes place below bend 174.

Upon application of an upwardly force on tip 176 that first, causes bend 178 to disengage from cross arm 145 and second, causes tine 170 to shoot upward, bend 174 prevents tine 170 from navigating through apertures 164. The upwardly force is only an instantaneous force and in most circumstances is dissipated once bend 174 reaches aperture 164b. In order for tine 170 to completely disengage from cross arm 145, a second upward force acting on tine 170 is required to deform stem 172 proximate bend 174 so that bend 174 can pass through bottom aperture 164b, as shown in FIG. 13C.

Once bend 174 navigates through bottom aperture 164b, the deformation of stem 172 relaxes and tine 170 is retained in this position, with bend 174 trapped within cross arm 145 as shown in FIG. 13D. In some cases an upward force on tip 176 may in fact be of sufficient magnitude to cause tine 170 to immediately reach the position of FIG. 13D. This position is an equilibrium position and demonstrates retractibility of tine 170. A third upward force is then required to deform stem 172 proximate bend 174 once again, as shown in FIG. 13E, so that bend 174 can pass through top aperture 164a. The deformation that takes place for bend 174 to pass through top aperture 164a is similar to the deformation that takes place for bend 174 to pass through bottom aperture 164b. After bend 174 passes through top aperture 164a, as in FIG. 13F, tine 170 is freely removable from cross arm 145.

Reinsertion of tine 170 through apertures 164 of the same tine position, or any other tine position, requires application of at least one continuous downward force along stem 172 of tine 170. Alternatively, two successive downward forces may be exerted along stem 172, to urge passage of bend 174 through top aperture 164a and then through bottom aperture 164b, respectively. The process of inserting tine 170 through pair 162 of apertures 164 would follow FIGS. 13A–F in reverse order, starting with FIG. 13F. If capturing of bend 174 within cross arm 145 is not desired, apertures 164 can be appropriately sized so that stem 172 does not undergo deformation during insertion and removal of tine 170. Only the force from the fingers of a user's hand is required to install tines 170 on cross arm 145, or to manually release and remove tines 170 from cross arm 145.

FIGS. 14A and B, FIG. 14C, and FIGS. 15A and B, together show unique aspects of the present invention that reside in tines 170 operating in conjunction with apertures 164 of cross arm 145. FIGS. 14A and B illustrate front-to-back freedom of movement of tines 170 on cross arm 145 as a result of the larger diameter of apertures 164 compared to the diameter of tines 170. Clearance c allows stem 172 of tine 170 to be positioned within apertures 164 such that stem 172 in an ideal situation is centered within apertures 164. More likely stem 172 is positioned such that stem 172 is in contact with the circumference of aperture 164a, or aperture 164b, or both.

In FIGS. 14A and B, centerline CL only aligns with the centerline of tine 170 when stem 172 is concentric with apertures 164. Instead as actually shown in FIGS. 14A and B, tine 170 with clearance c may assume a position where the opposite sides of stem 172 are in contact with the circumference of apertures 164*a* and 164*b*, respectively. The force of gravity keeps tine 170 in the position of FIG. 14B before tine 170 is placed in contact with an expansive surface. When tine 170 is placed in contact with an expansive surface, tine 170 assumes the position of FIG. 14A, due to the downward acting weight of lawn rake 100. An arc of displacement DD denotes the angle subtended by the centerline of stem 172 with centerline CL, when tine 170 reaches an upper limit of movement due to stem 172 contacting the circumferences of apertures 164, as shown in FIG. 14A.

An arc of displacement DD' denotes the angle subtended by the centerline of stem 172 with centerline CL, when tine 170 reaches a lower limit of movement due to stem 172 contacting the circumferences of apertures 164, as shown in FIG. 14B. At either limit of movement it is assumed there is no bending of tine 170. Arc of displacements DD and DD' may be considered to be equal. Movement of tine 170 from the position of FIG. 14A to the position of FIG. 14B demonstrates engageable operation of looped bend 178 around cross arm 145, in conjunction with movement of stem 172 loosely positioned within apertures 164, to provide pivotal movement of tine 170 within a vertical plane.

FIG. 14C shows side-to-side freedom of movement of a tine 170*w* mounted on cross arm 145. Apertures 164 oversized with respect to stem 172, and clearance c between looped bend 178 and cross arm 145, allow stem 172 to rotate on its axis and pivot laterally. A position P and a position P' denote respectively, the left and right limits of movement of tine 170*w* such that bend 178 contacts cross arm 145. Movement of tine 170*w* is typical of movement of any tine 170. In moving from position P to position P', tine 170*w* can rotate within a horizontal arc H. This horizontal rotation is further demonstration of the pivotal mounting of tines 170 on cross arm 145. Previous figures have shown bend 178 in an idealized position with bend 178 oriented perpendicular to cross arm 145. In actuality, clearance c and apertures 164 permit bend 178 to pivot back and forth around the axis of stem 172 during raking action as loading conditions require. The pivoting represents a second freedom of movement of tines 170, in addition to the freedom of movement within the plane of tine 170 demonstrated in FIGS. 14A and 14B. The combined freedoms of movement shown in FIGS. 14A and B, and FIG. 14C, illustrate the ability of tines 170 to absorb unbalanced forces by causing tines 170 to shift position, unless the forces are of such magnitude to cause one or more tines 170 to release from cross arm 145.

Tines 170 possess additional freedom of movement to rock back and forth in the plane of array 160. Consequently, it has been demonstrated that tines 170 possess the capability of freedom of movement in three perpendicular planes. Thus, the present invention introduces and controls looseness between tines 170 and cross arm 145. Freedom of movement of tines 170 is promoted by means of clearance c and/or oversized apertures 164, assisted by the flexible resilience of the material composing tine 170, thereby minimizing stresses. These characteristics in combination with end gap e, then control the upward force required to release tine 170 from across arm 145.

The advantage of the freedom of movement of stem 172 within apertures 164 becomes further apparent in conjunction with the explanation of FIGS. 15A and B. These two figures illustrate the configurations of tine 170 when undergoing deflection due to the application of loads during raking action. Upon initiating raking action by placement of tines 170 in contact with an expansive surface, tines 170 deflect as shown in FIG. 15A, with the deflection superimposed on arc of displacement DD previously shown in FIG. 14A. In this configuration, each of tines 170 forms a concave arcuate curve C1. As shown in FIG. 15B, during raking action, upon release of tines 170 from contact with the ground, tines 170 deflect forward, the deflection superimposed on arc of displacement DD' previously illustrated in FIG. 14B. The forward deflection results from the resilient elasticity of tines 170 which causes a release of elastic strain energy that is stored in tines 170 when tines 170 are in the configuration of FIG. 15A. The release of the elastic strain energy causes the forward propelled movement of each tine 170 within apertures 164 in addition to a counterbending of each tine 170 to form a convex arcuate curve C2.

Apertures 164 have consequently magnified the effect of the deflection of tine 170 by allowing a greater physical movement of tines 170 before the forward deflection of tine 170 is stopped by the contact of stem 172 with bottom aperture 164*b*. The greater physical movement of tines 170 produces the effect of greater physical movement of leaves and lawn debris, thus propelling the leaves and lawn debris father than would occur with apertures that allowed no freedom of movement to tines 170. In addition, tines 170 have a relatively long period of oscillation due to their long unsupported length and consequently tines 170 are able to remain in contact with, and transfer energy to, leaves and lawn debris for a longer period of time.

Apertures 164 that are oversized with respect to stem 172 offer an additional benefit in the present invention. The formation of concave curve C1 and convex curve C2, in FIGS. 15A and 15B, respectively, include curvature of stem 172 where it passes into, through, and out of cross arm 145, by means of apertures 164. The curvature of stem 172 continues to the point where stem 172 forms a juncture with bend 178. As tine 170 deflects, bend 178 shifts in position on cross arm 145 according to the internal forces that develop within stem 172 due to the applied bending moments. Without the oversized opening of aperture 164*b*, stem 172 would be fixedly held where stem 172 first passes into cross arm 145, as a cantilever with a rigid support. Maximum bending stresses would occur at this point. Instead, the curvature of tine 170 continues inside of cross arm 145 such that flexity can develop where stem 172 joins bend 178, to form an elastic support. A coupled pair of forces develops at the points where stem 172 contacts top aperture 164*a* and bottom aperture 164*b*, to help resist the applied bending forces, in conjunction with the mechanical anchoring of bend 178 in contact with cross arm 145. Bend 178 serves as a moving anchorage, having an inherent looseness for movement circumferentially around cross arm 145, or rotatably around stem 172, that serve to reduce the stresses in tine 170.

As a method of operation for raking action, lawn rake 100 possesses all of the lawn raking characteristics of most other broom style lawn rakes in the prior art. Tines 170 have considerable lateral flexibility so that tines 170 may deflect around a protruding object after lawn rake 100 begins to be drawn across a lawn. Generally, however, tines 170 remain in substantially straight and parallel alignment during straight-ahead raking action. This alignment is achieved by the engagement of bend 178 with cross arm 145, serving to act as a rudder for tines 170 to keep them in alignment, thus maintaining tips 176 in an orientation that is generally perpendicular to the expansive surface upon which lawn rake 100 operates. The circular surface of tips 176 presents a relatively large area of contact with the expansive surface and thus there is less of a tendency for tines 170 to dig into the expansive surface, compared to a rake that does not have tines with circular tips. Therefore, raking resistance developed as a result of tips 176 contacting the expansive surface, and thus raking effort, is also less. In addition, the cylindrical nature of stems 172 offers less resistance to grass through which tines 170 are moving, minimizing the tearing and ripping of grass as tines 170 pass.

Lawn rake 100 also possesses unique characteristics of manipulation that increase its effectiveness in gathering leaves and lawn debris. As demonstrated in FIG. 14C, pivotal freedom of movement of tines 170 allows looped bend 178 to rotate back and forth. This rotation can take place when there is a change in direction of lawn rake 100 away from a straight-ahead direction. Manipulation of lawn rake 100 can therefore have a sideways component or an arcuate component of motion not achievable with other lawn rakes. Tines 170 with a circular cross section have uniform strength and uniform flexity in all directions. Thus, tines 170 easily flex, and looped bends 178 quickly align, to accommodate any raking direction, or change in raking direction. Torsional stresses on tines 170 are consequently reduced. The fixed rectangular tines of other lawn rakes do not possess this ease of manipulation in different and changing directions.

The attributes of manipulation that are unique to the present invention are illustrated in FIGS. 16A–C. A top view of lawn rake 100 in raking position is shown in FIG. 16A. As described earlier, direction of movement M denotes conventional, straight-ahead raking action. Straight-ahead raking action is usually the only direction of manipulation possible with lawn rakes of the prior art having flat, rectangular tines. For lawn rake 100, directions of movement M1, M2, M3, M4, M5, and M6 are shown as representative directions of raking action that can be accomplished in addition to movement M. Movements M1, M2, M3, M4, M5, and M6 can be accomplished due to the uniform stiffness provided by tines 170 having a circular cross section, and due to the pivotal freedom of movement of tines 170 mounted on cross arm 145.

Movements M1–6 are especially unique in the present invention because they can take place while cross arm 145 remains parallel to its original orientation shown in FIG. 16A. Thus, users of lawn rake 100 do not have to move their feet as frequently in order to rake a larger area. In FIG. 16B, lawn rake 100 is shown having progressed from its position in FIG. 16A with components of movement both ahead and to the right. For tines 170 having a uniform stiffness in all raking directions, a user of lawn rake 100 does not notice a change in raking resistance due to a different raking direction or to a change in raking direction, all while the tines remain in contact with the ground. The characteristics of lawn rake 100 also allow direction of movement M6 that only has a sideways component, such as might be encountered in trying to sweep wet eaves from a curb gutter or from flower bed edging. Thus, lawn rake 100 may be manipulated laterally to progress from its position in FIG. 16A to its position in FIG. 16C. Movements M1–6 are only representative and any direction of movement or combinations of directions of movement can be achieved in the quadrant defined by movements M1 and M6. Movements M1–6 are shown having components of lateral movement rightward. Similar movements leftward are equally possible.

Figure 17:
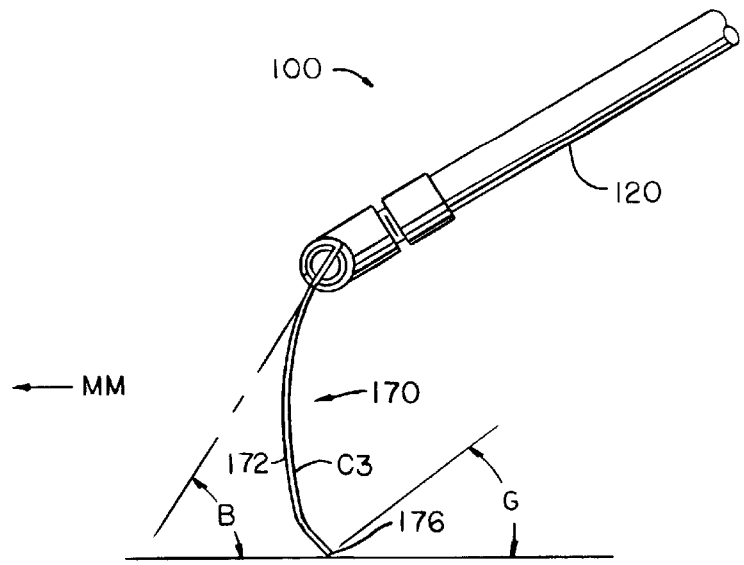
FIG. 17 is a partial side elevation view showing a lawn rake of the present invention in a leaf and lawn debris pushing mode, and the associated deflection of the tines.

Lawn rake 100 has an additional method of operation that involves the pushing of leaves and lawn debris in a series of pushing motions, much as one would use a push broom. The pushing motion may also be one continuous forward movement of moving an accumulated pile of leaves and lawn debris as the user walks behind lawn rake 100 while pushing lawn rake 100 in a forward direction. Lawn rake 100 is shown in FIG. 17 configured to accomplish a pushing action. Tines 170 deflect to form a convex arcuate curve C3. Storage of elastic strain energy in stems 172 of tines 170 provides a springy resilience that maintains tips 176 in contact with the ground. An angle G is an acute angle subtended by tips 176 and the expansive surface. Any time that the pressure on tines 170 is reduced so that stems 172 can straighten out, tips 176 spring forward to sweep the lawn in front of tips 176 clear of leaves. Aspects of tines 170 explained in relation to FIGS. 15A and B, contribute to the capability of lawn rake 100 to operate in a leaf and lawn debris pushing mode.

Alternatively, the forward springing motion of tips 176 urges any pile of accumulated leaves and lawn debris that is being moved, clear of tips 176. Consequently, the method of operation of pushing leaves is an effective means for rapidly moving an accumulated pile of leaves and lawn debris without having to repetitively apply a series of raking actions to rake leaves toward the user as the user backs up step-by-step. Angle A (shown in FIG. 2), together with angle B, is the determining factor that enables pushing mode operation to be accomplished. Angle A allows the user of lawn rake 100 to hold handle 120 in one's hands, with tines 170 in contact at angle B (FIG. 2) with respect to the ground, and apply a forward movement MM to lawn rake 100 that allows tines 170 to deflect without exceeding the elastic limit of the material of which tines 170 are composed. Tines 170 then deflect back towards the user, with the edges of tips 176 maintaining contact with the ground to provide a moving barrier trapping and forwardly urging leaves and lawn debris.

Figures 18A, 18B, 18C, 18D, 18E:
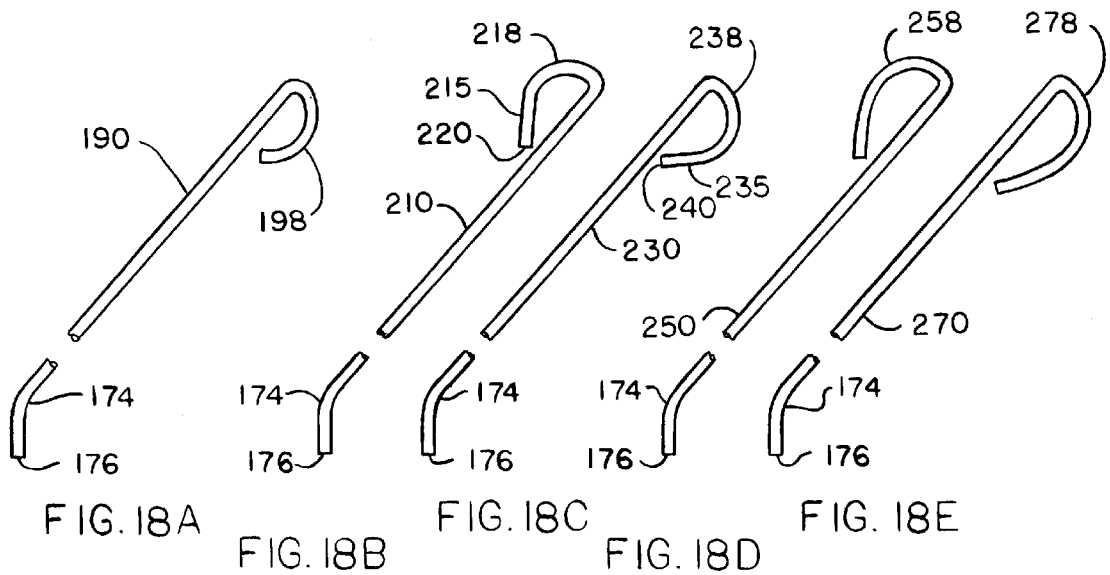
FIGS. 18A–E show fragmented side elevation views of alternative tines usable with a lawn rake of the present invention.

Alternative configurations of tines are shown in FIGS. 18A–E. A tine 190 in FIG. 18A has a looped bend 198 turned downwards so that tine 190 engages cross arm 145 from below. Tine 190 otherwise possesses the same attributes as tine 170. In FIG. 18B, a tine 210 includes a looped bend 218 that becomes cotangent with a segment 215, terminating in a tine end 220. A tine 230 in FIG. 18C includes a looped bend 238 that turns downward so that tine 230 engages cross arm 145 from below. Bend 238 is cotangent with a segment 235, terminating in a tine end 240. Tines 210 and 230 differ from tines 170 and 190, by substitution of straight segments 215 and 235, for part of bends 218 and 238, respectively. In FIG. 18D, a tine 250 includes a bend 258 that provides additional clearance and looseness of bend 258 when tine 250 is mounted on cross arm 145. A tine 270 in FIG. 18E includes a bend 278 similar to bend 258 except that it turns downward, engaging cross arm 145 from below.

Tines 190, 210, 230, 250, and 270, all have bend 174 proximate ground engaging tip 176. Tines 190, 210, 230, 250, and 270, all have the same attributes of removability, insertability, releasability, and energy absorption already described with regard to tine 170. Tines 190, 210, 230, 250, and 270, may each have the same material of composition as tine 170.

Figure 19:
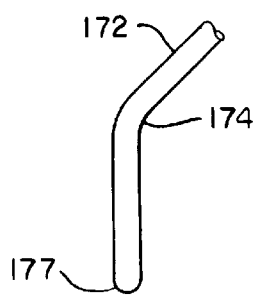
FIG. 19 is a side elevation view of an alternative ground engaging tip.

Usable with all of tines 190, 210, 230, 250, and 270, or any other tine having a circular cross section, is a ground engaging tip 177 as shown in FIG. 19. Tip 177 has a rounded or hemispherical shape that provides less resistance to raking action when drawn across the ground. Tip 177 further tends to ride up and over any irregularities in a lawn surface. The rounded nature of tip 177 also tends to deflect stem 172 laterally upon application of an upwardly force on tip 177 during raking action rather than transmitting the force upwards along stem 172 to cause release of tine 170 or any other tine, from cross arm 145. This occurs because an upwardly directed force on tip 177, unless applied dead center to tip 177, would impact the roundness of tip 177 at an angle not normal to tip 177. Consequently, the resultant force on tip 177 would have both a vertical component and a horizontal component, the horizontal component tending to cause tip 177 to move sideways. Thus, the upward effect of the force is deflected laterally and diminished.

As explained earlier, apertures 164 having a diameter that is larger than the diameter of tines 170 provide an additional benefit during raking action other than for releasability of tines 170. During raking action, tines 170 deflect backwards as tines 170 are drawn across an expansive surface such as a lawn. Upon release of tines 170 from contact with the ground, the release of the elastic strain energy stored within tines 170 as a result of the deflection, cause tines 170 to unbend and recoil. The larger diameter of apertures 164 allows tines 170 to counterbend past the undeflected equilibrium position and provide greater forward urgement to leaves and lawn debris than a lawn rake having tines with no freedom of movement at their anchoring point. This counterbending action can be enhanced by using a slotted bottom aperture instead of a circular aperture.

Figure 20:
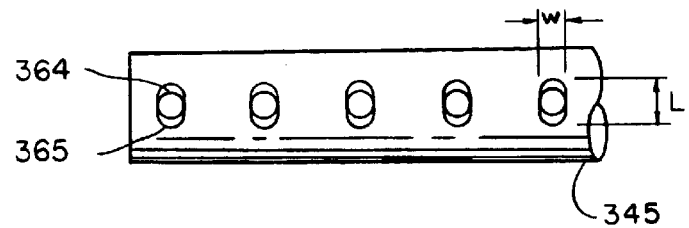
FIG. 20 is a partial bottom view of an alternative cross arm showing slotted apertures for mounting of the tines.

FIG. 20 is a partial bottom view of a cross arm 345 having a plurality of circular top apertures 364 and a plurality of slotted bottom apertures 365. The centers of top apertures 364 and bottom apertures 365 are diametrically aligned with respect to cross arm 345. Top apertures 364 of cross arm 345, can be seen through bottom apertures 365 in FIG. 20. A width w of bottom apertures 365 is identical to the diameter of top apertures 364. A length L is the length of the slot of bottom apertures 365. The long direction of bottom apertures 365 is oriented perpendicular to the axis of cross arm 345. Length L is a predetermined value that provides optimal forward urgement to leaves and lawn debris during raking action, when tines 170 are lifted off the ground. Length L allows tines 170 greater front-to-back movement associated with the storage and release of elastic strain energy during raking action as explained with reference to FIGS. 15A and B.

Figure 21:
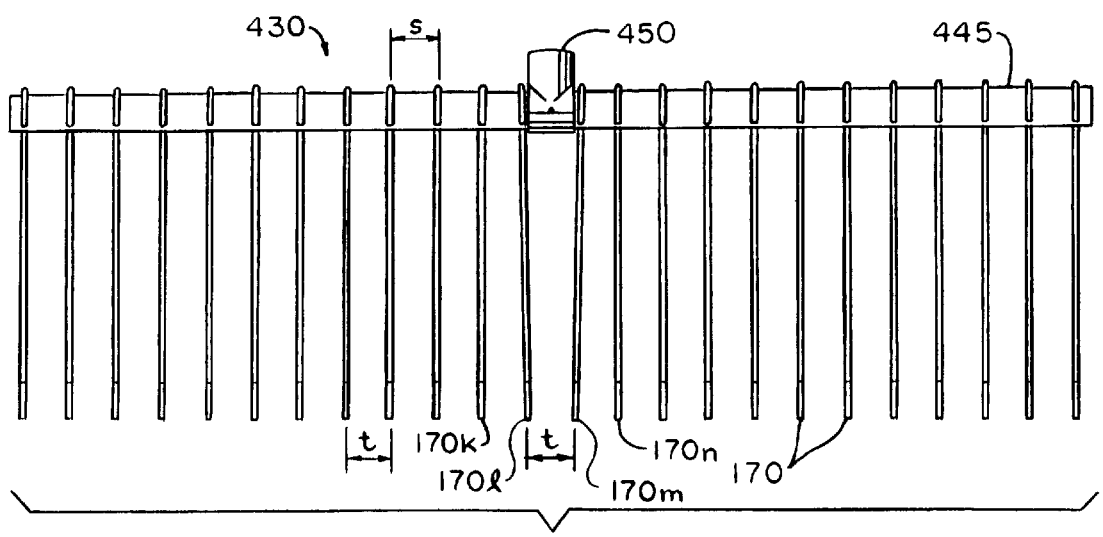
FIG. 21 is a front elevation view of an alternative cross head assembly.
Figure 21A:
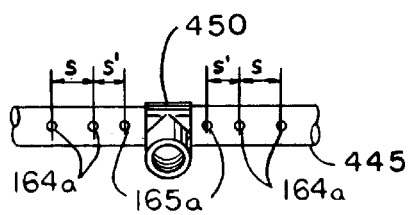
FIG. 21A is a partial top view of the cross head of the alternative cross head assembly of FIG. 21.

An alternative cross head assembly 430 is shown in FIG. 21. Cross head assembly 430 includes a truncated tee 450, a cross arm 445, and plurality of tines 170. For cross head assembly 430, the width of truncated tee 450 is a value such that uniform parallel side-by-side spacing of all tines 170 can not be accomplished. A tine 170*l* and a tine 170*m* are located adjacent the sides of truncated tee 450, respectively. A tine 170*k* is adjacent tine 170*l*, and a tine 170*n* is adjacent tine 170*m*. In order to maintain uniform tip spacing t, tines 170*l* and 170*m* are convergent Truncated tee 450 may have tapered ends to accommodate the convergence of tines 170*l* and 170*m*. An aperture spacing s denotes the center-to-center distance of top apertures 164*a* and bottom apertures 164*b* of adjacent tines 170 that are parallel. Tines 170*l* and 170*m* are each installed through a pair 162 of a top aperture 165*a* and a bottom aperture 165*b*. Aperture spacing s is equal to tip spacing t. As further shown in FIG. 21A, an aperture spacing s' denotes the center-to-center distance of top aperture 165*a* of tine 170*l* from top aperture 164*a* of tine 170*k*, as well as the center-to-center distance of top aperture 165*a* of tine 170*m* from top aperture 164*a* of tine 170*n*.

Figure 21B:
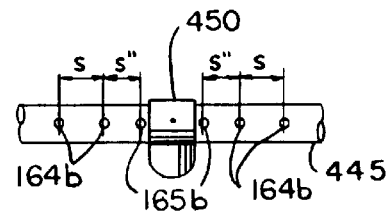

In FIG. 21B an aperture spacing s" denotes the center-to-center distance of bottom aperture 165*b* of tine 170*l* from bottom aperture 164*b* of tine 170*k*, as well as the center-to-center distance of bottom aperture 165*b* of tine 170*m* from bottom aperture 164*b* of tine 170*n*. For tip spacing t of ⅞ of an inch, aperture spacings s' and s" for convergent tines 170*l* and 170*m* are approximately ½ inch and 9/16 inch, respectively. In this arrangement, apertures 165*a* and 165*b* are not diametrically opposed. For cross head assembly 430, apertures 165*a* are colinear with apertures 164*a* and apertures 165*b* are colinear with apertures 164*b*. All other structural and operational characteristics of cross head assembly 430 are the same as cross head assembly 130.

Figure 22:
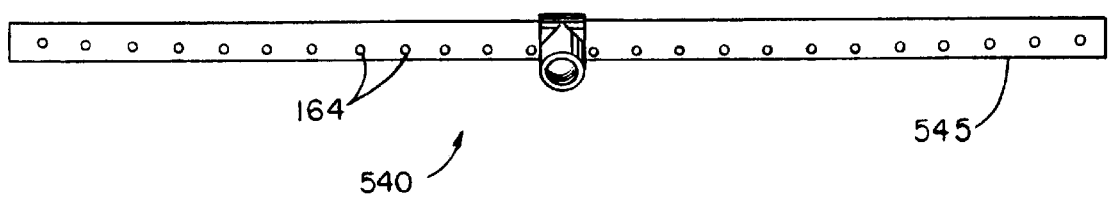
FIG. 22 is a top view of a cross head showing an alternative arrangement of apertures.
Figure 23:
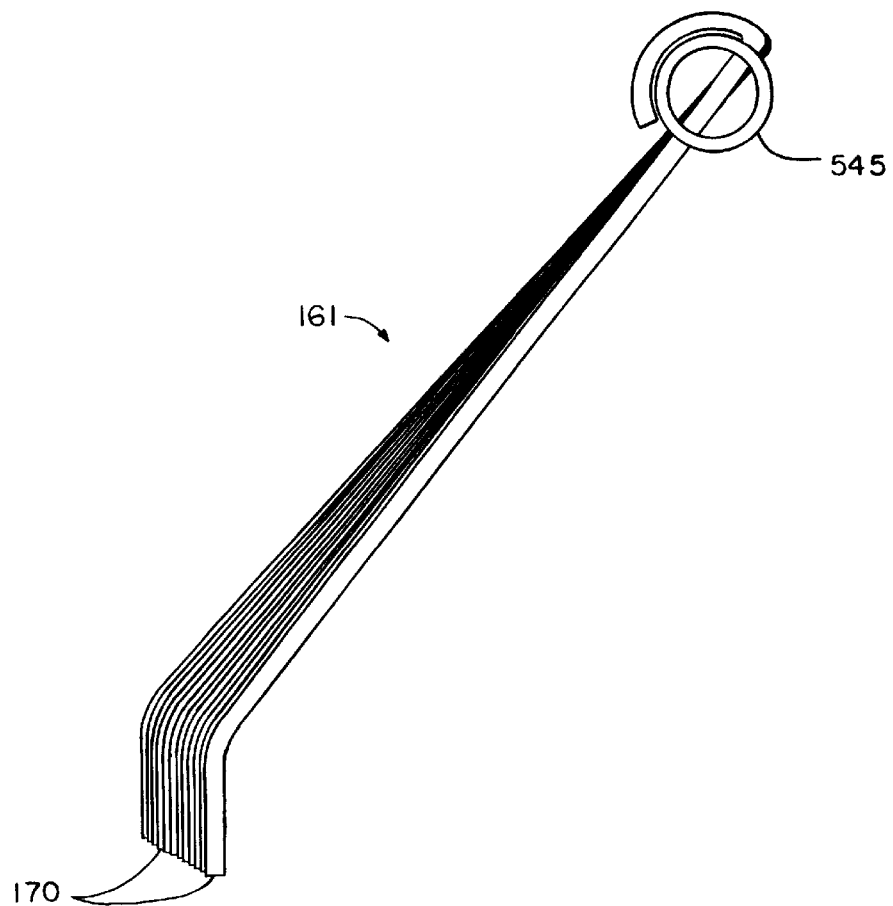
FIG. 23 is a side elevation view of the cross head of FIG. 22, showing the tines mounted thereon, with the truncated tee omitted for ease of illustration.

In FIG. 22 an alternative cross head 540 is shown. Cross head 540 includes a cross arm 545 and plurality of pairs 162 of diametrically opposed apertures 164. In contrast to cross arm 145, apertures 164 of cross arm 545 are not arranged in a colinear manner. Instead, apertures 164 for cross arm 545 may be arranged in an arcuately curved manner, as shown in FIG. 22. The benefit of this arrangement is shown in FIG. 23 where tines 170 are shown mounted on cross arm 545. The arcuate arrangement of apertures 164 along cross arm 545 causes tines 170 to be displaced one from another. An array 161 of tines 170 is consequently not coplanar and instead forms a gently curving convex arrangement of tines 170. The attributes of cross arm 445 of cross head assembly 430 shown in FIG. 20, having aperture spacing s' for apertures 165*a* and aperture spacing s" for apertures 165*b*, may be combined with the attributes of cross arm 545.

Figure 24:
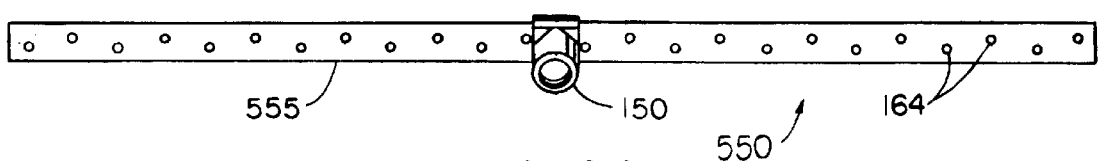
FIG. 24 is a top view of a cross head showing a second alternative arrangement of tines.
Figure 25:
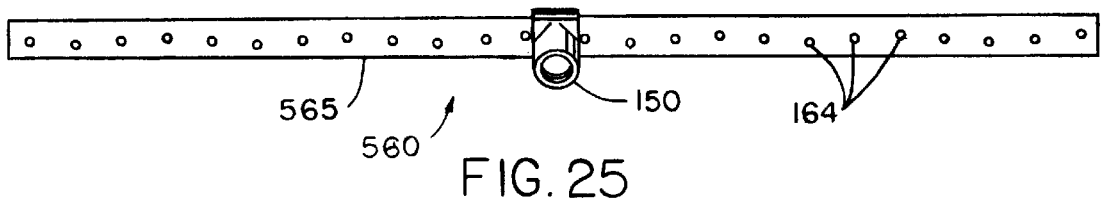
FIG. 25 is a top view of a cross head showing a third alternative arrangement of apertures.

Other arrangements of apertures on cross arms are feasible, offering varied benefits in the present invention. A cross head 550 in FIG. 24 shows a cross arm 555 with apertures 164 in a pattern of staggered pairs such that tines 170 align in two alternating rows. A cross head 560 in FIG. 25 shows a cross arm 565 with apertures 164 in a pattern of staggered triplets such that tines 170 align in three sequential rows. Many other patterns are possible due to the unique characteristic of the tubular cross arm in the present invention to situate tine engaging apertures anywhere around or along the cross arm, independently of the apertures of adjacent tines. Thus, it has been demonstrated for any cross head assembly of the present invention, that the three dimensional spatial relationship of tines 170 to form an array can be infinitely varied without consideration of structural relationships of one tine to another. Furthermore, the variation of tine orientation and array configuration can take place independently of other components of the cross head assembly. This capability is a direct consequence of the tubular nature of the cross arms of the present invention and the mounting method for the tines.

Cross arm 555 is shown in side view in FIG. 26 with tines 170 mounted thereon. A row R1 and a row R2 distinguish between the two rows of tines within which tines 170 are alternately disposed. Cross arm 565 is shown in side elevation view in FIG. 27 with tines 170 mounted thereon. A row R3, a row R4, and a row R5 distinguish between the three rows of tines within which tines 170 are sequentially disposed.

A cross arm 645 that has apertures that are not diametrically opposed is shown in FIG. 28. A top aperture 664*a* and a bottom aperture 664*b* comprise a pair 662 of apertures 664. Cross arm 645 differs from cross arm 145 of FIG. 5 in that apertures 664 are oppositely aligned along a chord of cross arm 645. It can thus be said that apertures 664 are chordally opposed, with diametrically opposed apertures 164 previously described being a specific case of a chord that is located on a diameter of cross arm 145.

A tine 670 shown in FIG. 29 for use with cross arm 645 includes a stem 672 with a looped bend 678 that semicircularly engages cross arm 645. A line tangent to bend 678 where bend 678 intersects stem 672, subtends an obtuse angle V with stem 672. Obtuse angle V so approximated subjects tine 670 to less stress than tine 170 would be subjected to as a result of the generally perpendicularly intersection of bend 178 with stem 172. Tine 670 otherwise retains similar characteristics of insertability, removability, releasability, and energy absorption, as tine 170. FIG. 29A is an enlargement of bend 678 in engagement with cross arm 645 showing the chordally passage of tine 670 through apertures 664. A partial top view of cross arm 645 is shown in FIG. 30, taken in the direction D of FIG. 28. Cross arm 645 is thus shown with apertures 664 in colinear alignment.

Lawn rake 100 further possesses the capability of being sold commercially disassembled. The ease of removal and installation of tines 170 disposes lawn rake 100 to be readily assembled from a kit of parts. In particular, the elongated nature of handle 120, cross head 140, and tines 170, lends to lawn rake 100 being packaged disassembled in a cylindrical mailing tube for direct shipment to individual customers. Of course, lawn rake 100 also retains the ability to be sold as a kit of parts in a retail store, as well as being sold completely assembled in a retail store. In FIG. 31 a cylindrical mailing tube 700 illustrates the packaging of lawn rake 100 as it might be accomplished within tube 700. Tube 700 may have a diameter of approximately three inches or more for the ease of packaging lawn rake 100 as separate components.

For those persons who do not want to install each individual tine, lawn rake 100 can also be packaged as two separate components comprising handle 120 and cross head assembly 130. Packaging of lawn rake 100 in this manner generally results in a relatively long, narrow, and flat package, that also lends itself to being shipped mail order. A mailing container that is flat and rectangular may have dimensions of approximately 52 inches high by 12 inches wide by 1 and ½ inches thick for shipping lawn rake 100 as separate components of handle 120 and cross head assembly 130. With a handle that is disassemblable into two separate pieces, an even more compact shipping container can be utilized that might have dimensions of only 26 inches high by 12 inches wide by 1 and ½ inches thick. Other packages with different dimensions may serve equally well. What has been accomplished is the reduction of empty space within a mailing container that would otherwise increase the size of a mailing container as well as the cost of shipping.

CONCLUSION

A new and novel lawn rake has been invented that embodies unique characteristics to the cross head assembly and tines. The lawn rake can be manipulated to provide conventional straight-ahead raking action. The lawn rake can also be manipulated with a lateral component of movement, or a swirling motion, or an arcuate motion, or any other lateral movement, or with a sudden change in direction. All of these movements can be achieved with the tines in contact with the ground. The capability for these movements increases the effectiveness, efficiency, and ease of use of the present invention compared to the prior art. The lawn rake can also be utilized in a pushing mode to move piles of leaves and lawn debris.

The elements that cooperatively work together are: a cross arm having a closed tubular cross section, that provides an attaching point and support for the tines; apertures having dimensions larger than the diameter of the tines, for ease of inserting the tines and for loosely positioning the tines on the cross arm; and individual tines that have a looped bend that allows ease of attachment to the cross arm and freedom of movement of the tines when mounted on the cross arm. The looped bend and apertures trap a tine on the cross arm without a rigid, fixedly secured connection. These elements provide attributes and benefits not seen in the prior art. A truncated tee is mounted on the cross arm to secure it to a handle. In particular, the tines are loosely constrained horizontally and vertically under most conditions of loading. However, the tines can adjust position to align with the direction of raking motion and to counteract imposed raking forces, thereby minimizing stresses. Furthermore, during raking action, a force acting upwardly on the ground engaging tip of a tine can cause release of the tine from the cross arm such that breakage of the tine is prevented.

The tines are individually installable, individually replaceable, individually releasable, and individually energy absorbing, without the interaction of any other tine of the lawn rake. In addition to a planar array, various curved or undulating arrays of tines can be formed. The simple configuration of a closed tube for the cross arm allows independent mounting of each tine without regard to structural relationship either to a neighboring tine or to the cross head assembly in general.

The lawn rake in general, and the cross head assembly in particular, can be manufactured from substantially mass-produced parts that are readily available. Polyvinylchloride or other thermoplastic materials are ideally suited for the manufacture of the lawn rake. Ease of removal and installation of the tines allow commercial distribution of the lawn rake as a compact kit of parts. The lawn rake of the present invention is thus easy and inexpensive to manufacture, lightweight, and durable under arduous and repetitive use. Replaceability of the tines in particular makes the present invention a long-lasting product.

Thus, a lawn rake has been invented that is easier and more efficient to use. Beyond the alternatives and embodiments herein presented, someone with ordinary skill in the art could consider the use of an arcuately curved cross arm, either vertically, or horizontally, or a combination of both. As another possibility, a truncated tee that is not medially located could also be explored by those skilled in the art Numerous other combinations with elements of the prior art could easily be accomplished.

Accordingly, preferred and alternative embodiments of the present invention have been illustrated and described. Those skilled in the art will now see that certain modifications can be made to the invention herein disclosed with respect to the preferred and alternative embodiments without departing from the spirit of the present invention. Furthermore, while the invention has been described above with respect to preferred and alternative embodiments, it will be understood that it is capable of numerous rearrangements, modifications, and alternatives, and all such rearrangements, modifications, and alternatives are intended to be within the scope of the appended claims and their legal equivalents.

I claim:

1. A lawn rake, comprising:
   (a) handle means for manipulation of said lawn rake in predetermined manners to effect a raking action;
   (b) cross head means connected to said handle means and serving as a support;
   (c) a plurality of tine means forming an array carried by said cross head means for coaction with a surface and or material disposed upon the surface when the lawn rake is effecting a raking action;
   (d) said cross head means including a tubular, elongated member having a plurality of pairs of apertures in spaced arrangement, each said pair of apertures of said plurality of pairs of apertures loosely positioning one said tine means of said plurality of tine means on said cross head means;

(e) each said tine means of said plurality of tine means being composed of a resilient material, each said tine means including a ground engaging tip, and each said tine means having a looped bend distal said ground engaging tip for engaging the outside cylindrical surface of said member;

(f) said apertures of each said pair of apertures of said plurality of pairs of apertures have clearance with respect to said tine means such that upon application of one or more predetermined forces on each of one or more said tine means during said raking action, said loose positioning results in lateral movement of each of said one or more tine means within the openings of the apertures of the respective said pair of apertures of each of said one or more tine means; and (g) each said pair of apertures of said plurality of pairs of apertures insertably receives said tine means, and each said tine means is individually removable.

2. The lawn rake of claim 1, wherein said looped bend has a shape including an arc segment of a circle, said looped bend having an inside diameter at said arc segment approximating the outside diameter of said member; and said looped bend pivotally anchors said tine means on said cross head means.

3. The lawn rake of claim 2, wherein said apertures are circular, each said pair of apertures of said plurality of pairs of apertures comprises a top aperture and a bottom aperture, and said top apertures are colinear and said bottom apertures are colinear.

4. The lawn rake of claim 3, wherein each said tine means of said plurality of tine means has a cross-sectional shape that is circular.

5. The lawn rake of claim 4, wherein said member is made from a material selected from the group consisting of aluminum, fiberglass, and thermoplastic; and said plurality of tine means is made from a material selected from the group consisting of fiberglass and thermoplastic.

6. The lawn rake of claim 5, wherein said member is made from a thermoplastic material selected from the class of thermoplastic materials generally referred to as polyvinylchloride and said plurality of tine means is made from a thermoplastic material selected from the class of thermoplastic materials generally referred to as polyvinylchloride.

7. A lawn rake, comprising:

(a) handle means for manipulation of said lawn rake in predetermined manners to effect a raking action;

(b) cross arm means serving as a support;

(c) tee means mounted on said cross arm means for receiving said handle means;

(d) a plurality of tine means forming an array carried by said cross arm means for coaction with a surface and or material disposed upon the surface when the lawn rake is effecting a raking action;

(e) said cross arm means comprising a tubular, elongated member having a plurality of pairs of apertures in spaced arrangement, each said pair of apertures of said plurality of pairs of apertures positioning one said tine means of said plurality of tine means on said cross arm means, with said apertures of each said pair of apertures disposed on opposite sides of said cross arm means;

(f) each said tine means of said plurality of tine means being composed of a resilient material, each said tine means having a ground engaging tip, and each said tine means including a looped bend distal said ground engaging tip for releasably engaging the outside tubular surface of said cross arm means by snap action; and (g) said apertures of each said pair of apertures of said plurality of pairs of apertures have clearance with respect to said tine means such that each said tine means is individually mountable on and individually removable from, said cross arm means by application of finger force; and each said pair of apertures loosely positions its respective said tine means on said cross arm means within the lateral constraints of the perimeters of said apertures of said pair of apertures.

8. The lawn rake of claim 7, wherein each said pair of apertures of said plurality of pairs of apertures insertably receives said tine means.

9. The lawn rake of claim 8, wherein at least part of said looped bend has the shape of an arc segment of a circle, said looped bend having an inside diameter at said arc segment approximating the outside diameter of said cross arm means; and said looped bend pivotally anchors said tine means on said cross arm means.

10. The lawn rake of claim 9, wherein said array is substantially coplanar, each said pair of apertures of said plurality of pairs of apertures comprises a top aperture and a bottom aperture, said top apertures and said bottom apertures are circular, said top apertures are colinear, and said bottom apertures are colinear.

11. The lawn rake of claim 10, wherein each said tine means of said plurality of tine means includes a stem intermediate said looped bend and said ground engaging tip, and said stem has a cross-sectional shape that is circular.

12. The lawn rake of claim 11, wherein said member is made from a material selected from the group consisting of aluminum, fiberglass, and thermoplastic; and said plurality of tine means is made from a material selected from the group consisting of fiberglass and thermoplastic.

13. The lawn rake of claim 12, wherein said member is made from a thermoplastic material selected from the class of thermoplastic materials generally referred to as polyvinylchloride and said plurality of tine means is made from a thermoplastic material selected from the class of thermoplastic materials generally referred to as polyvinylchloride.

14. The lawn rake of claim 13, wherein said top aperture and said bottom aperture of each said pair of apertures are diametrically opposed with respect to said tubular elongated member.

15. A lawn rake, comprising:

(a) handle means for manipulation of said lawn rake in predetermined manners to effect a raking action;

(b) cross arm means serving as a support, said cross arm means comprising a tubular, elongated member;

(c) tee means mounted on said cross arm means for receiving said handle means;

(d) an array of tine means carried by said cross arm means for coaction with a surface and or material disposed upon the surface when the lawn rake is effecting a raking action;

(e) said cross arm means having a plurality of pairs of apertures in spaced arrangement for insertably receiving said tine means;

(f) each said tine means of said array of tine means being composed of a resilient material, each said tine means including a ground engaging tip, and each said tine means having a looped bend distal said ground engaging tip for engaging the outside tubular surface of said cross arm means by snap action;

(g) said apertures of each pair of apertures of said plurality of pairs of apertures have clearance with respect to said tine means such that each said tine means is individually mountable on and individually removable from, said cross arm means by application of finger force; and each said pair of apertures movably positions said tine means on said cross arm means within the lateral constraints of the perimeters of said apertures of each said pair of apertures; and (h) said looped bend is releasable from said cross arm means during said manipulation of said lawn rake upon application of a predetermined upwardly force on said ground engaging tip.

16. The lawn rake of claim 15, wherein said looped bend is formed as an arc segment of a circle, said looped bend having an inside diameter at said arc segment approximating the outside diameter of said cross arm means; and said looped bend pivotally anchors said tine means on said cross arm means.

17. The lawn rake of claim 16, wherein each said tine means of said array of tine means further includes a stem intermediate said looped bend and said ground engaging tip; and said stem and said looped bend have a cross-sectional shape that is circular.

18. The lawn rake of claim 17, wherein said array is substantially coplanar, each said pair of apertures of said plurality of pairs of apertures comprises a top aperture and a bottom aperture, each said top aperture is circular, said top apertures are colinear, and said bottom apertures are colinear.

19. The lawn rake of claim 18, wherein said member is made from a material selected from the group consisting of aluminum, fiberglass, and thermoplastic; and each said tine means of said array of tine means is made from a material selected from the group consisting of fiberglass and thermoplastic.

20. The lawn rake of claim 19, wherein said member is made from a thermoplastic material selected from the class of thermoplastic materials generally referred to as polyvinylchloride and all said tine means of said array of tine means are made from a thermoplastic material selected from the class of thermoplastic materials generally referred to as polyvinylchloride.

21. The lawn rake of claim 20, wherein said tee means includes a socket portion for connection of said handle means, and a barrel portion perpendicular to said socket portion, said barrel portion having an internal cylindrical surface for frictionally engaging said cross arm means, with the width of said barrel portion approximating the outside diameter of said socket portion.

22. The lawn rake of claim 21, wherein said top aperture and said bottom aperture of each said pair of apertures are diametrically opposed with respect to said cross arm means.

23. A lawn rake, comprising:

(a) a rake handle;

(b) a cross head connected to said rake handle, said cross head including an elongated cylindrical tube;

(c) a plurality of tines carried by said cross head;

(d) said tube having a plurality of top apertures in spaced arrangement and a plurality of bottom apertures in spaced arrangement, each said top aperture of said plurality of top apertures together with one said bottom aperture of said plurality of bottom apertures comprising a pair of apertures, with said top aperture and said bottom aperture of each said pair of apertures aligned on opposite sides of said tube for positioning one said tine of said plurality of tines on said cross head;

(e) each said pair of apertures of said plurality of pairs insertably receives one said tine of said plurality of tines, and each said tine is individually removable;

(f) each said tine of said plurality of tines being composed of a resilient material, each said tine terminating in a looped bend for releasably engaging the outside cylindrical surface of said tube by snap action, and each said tine including a ground engaging tip, distal said looped bend, freely disposed for coaction with a surface upon which the lawn rake operates;

(g) at least part of said looped bend is shaped as an arc segment of a circle, said looped bend having an inside diameter at said arc segment approximating the outside diameter of said tube; and said looped bend pivotally anchors said tine on said cross head; and (h) said top aperture and said bottom aperture of each said pair of apertures have clearance substantially around said one tine of said plurality of tines such that each said pair of apertures loosely positions its respective tine on said cross head and such that during said coaction, upon application of one or more predetermined forces on one or more said tines, the lateral position and or axial orientation of said one or more tines is are self-adjusting within the openings of the respective said pair of apertures of each of said one or more tines.

24. The lawn rake of claim 23, wherein said apertures are circular, said top apertures are colinear, and said bottom apertures are colinear.

25. The lawn rake of claim 24, wherein each said tine of said plurality of tines has a cross-sectional shape that is circular.

26. The lawn rake of claim 25, wherein said tube is made from a material selected from the group consisting of aluminum, fiberglass, and thermoplastic; and said plurality of tines is made from a material selected from the group consisting of fiberglass and thermoplastic.

27. The lawn rake of claim 26, wherein said tube is made from a thermoplastic material selected from the class of thermoplastic materials generally referred to as polyvinylchloride and said plurality of tines is made from a thermoplastic material selected from the class of thermoplastic materials generally referred to as polyvinylchloride.

28. The lawn rake of claim 27, wherein said top aperture and said bottom aperture of each said pair of apertures are diametrically aligned on opposite sides of said tube.

29. A lawn rake, comprising:

(a) a rake handle for manipulation of said lawn rake in predetermined manners to effect a raking action;

(b) a cross arm comprising a tubular, elongated member having a radially symmetric cross section;

(c) a truncated tee mounted on said cross arm for receiving said rake handle;

(d) an array of tines carried by said cross arm;

(e) said cross arm having a plurality of pairs of apertures in spaced arrangement for insertably receiving said tines, said apertures of each said pair of apertures aligned on opposite sides of said cross arm;

(f) each said tine of said array of tines being composed of a resilient material, each said tine including a ground engaging tip, and each said tine having a looped bend distal said ground engaging tip for releasably engaging the outside surface of said cross arm by snap action;

(g) said apertures of each said pair of apertures have clearance substantially around one said tine of said array of tines such that each said tine of said array of tines is individually mountable on and individually removable from, said cross arm by application of finger force, and such that during said raking action, each said tine is laterally positionable and or axially rotatable on said cross arm within the openings of its respective said pair of apertures; and (h) said looped bend of each of one or more said tines of said array of tines is releasable from said cross arm during said raking action upon application of a predetermined upwardly force on the respective ground engaging tip of each of said one or more tines.

30. The lawn rake of claim 29, wherein at least part of said looped bend forms an arc segment of a circle, said looped bend having an inside diameter at said arc segment approximating the outside diameter of said cross arm; and said looped bend pivotally anchors said tine on said cross arm.

31. The lawn rake of claim 30, wherein said array is substantially coplanar, each said pair of apertures of said plurality of pairs of apertures comprises a top aperture and a bottom aperture, said top and bottom apertures are circular, said top apertures are colinear, and said bottom apertures are colinear.

32. The lawn rake of claim 31, wherein each said tine of said array of tines has a cross-sectional shape that is circular.

33. The lawn rake of claim 32, wherein said truncated tee includes a socket portion for connection of said rake handle, said truncated tee further includes a barrel portion perpendicular to said socket portion, with the width of said barrel portion approximating the outside diameter of said socket portion, and said barrel portion has an internal cylindrical surface for frictionally engaging said cross arm.

34. The lawn rake of claim 33, wherein said cross arm is made from a material selected from the group consisting of aluminum, fiberglass, and thermoplastic; said truncated tee is made from a thermoplastic material; and each said tine of said array of tines is made from a material selected from the group consisting of fiberglass and thermoplastic.

35. The lawn rake of claim 34, wherein said cross arm is made from a thermoplastic material selected from the class of thermoplastic materials generally referred to as polyvinylchloride, said truncated tee is made from a thermoplastic material selected from the class of thermoplastic materials generally referred to as polyvinylchloride, and each said tine of said array of tines is made from a thermoplastic material selected from the class of thermoplastic materials generally referred to as polyvinylchloride.

36. A lawn rake, comprising:

(a) a rake handle;

(b) a cross arm comprising a tubular, elongated member;

(c) a truncated tee mounted on said cross arm for receiving said rake handle;

(d) a plurality of tines in side-by-side spaced arrangement forming an array carried by said cross arm, said array subtending an obtuse angle with respect to said rake handle;

(e) said cross arm having a plurality of pairs of aligned apertures for inserting said tines;

(f) each said tine of said plurality of tines being composed of a resilient material, each said tine terminating in a looped bend for releasably engaging the outside cylindrical surface of said cross arm by snap action, and each said tine including a ground engaging tip, distal said looped bend and freely disposed for coaction with a surface upon which the lawn rake operates; and (g) each of said apertures of each said pair of apertures has clearance substantially around one tine of said plurality of tines such that each said tine of said plurality of tines is individually mountable on and individually removable from, said cross arm by application of finger force; and each said pair of apertures loosely positions said one tine of said plurality of tines on said cross arm such that during said coaction, upon application of one or more predetermined forces on one or more said tines, the lateral position and or axial orientation of said one or more tines is are self-adjusting within the openings of its or their respective said pair of apertures.

37. The lawn rake of claim 36, wherein said looped bend is formed into a shape including an arc segment of a circle, said looped bend having an inside diameter at said arc segment approximating the outside diameter of said cross arm; and said looped bend pivotally anchors said tine on said cross arm.

38. The lawn rake of claim 37, wherein each said pair of apertures of said plurality of pairs of apertures comprises a top aperture and a bottom aperture, said top apertures have a shape selected from the group consisting of circular and slotted, and said bottom apertures have a shape selected from the group consisting of circular and slotted.

39. The lawn rake of claim 38, wherein said spaced arrangement is selected from the group consisting of colinear, arcuately curvilinear, alternately disposed in two rows, sequentially disposed in three rows, and sequentially disposed in a plurality of rows.

40. The lawn rake of claim 39, wherein said spaced arrangement is symmetric about said truncated tee.

41. The lawn rake of claim 40, wherein said resilient material is selected from the group consisting of wire and rod, both having a circular cross-section.

42. The lawn rake of claim 41, wherein said truncated tee includes a socket portion for connection of said rake handle, and a barrel portion, perpendicular to said socket portion, said barrel portion having an internal cylindrical surface for frictionally engaging said cross arm, with the width of said barrel portion approximating the outside diameter of said socket portion.

43. The lawn rake of claim 42, wherein said member is made from a material selected from the group consisting of aluminum, fiberglass, and thermoplastic; said truncated tee is made from a thermoplastic material; and each said tine of said plurality of tines is made from a material selected from the group consisting of fiberglass and thermoplastic.

44. The lawn rake of claim 43, wherein said member is made from a thermoplastic material selected from the class of thermoplastic materials generally referred to as polyvinylchloride, said truncated tee is made from a thermoplastic material selected from the class of thermoplastic materials generally referred to as polyvinylchloride, and each said tine of said plurality of tines is made from a thermoplastic material selected from the class of thermoplastic materials generally referred to as polyvinylchloride.

45. The lawn rake of claim 44, wherein said top aperture and said bottom aperture of each said pair of apertures are diametrically aligned with respect to said cross arm.

46. The lawn rake of claim 45, wherein said obtuse angle ranges from about 130° to about 170°.

47. A lawn rake, comprising:

(a) a rake handle for manipulation of said lawn rake in first predetermined manners to effect a leaf and lawn debris raking action, and in second predetermined manners to effect a leaf and lawn debris pushing action;

(b) a cross arm comprising a tubular, elongated member;

(c) connecting means mounted on said cross arm for receiving said rake handle;

(d) a plurality of tines in side-by-side spaced arrangement forming an array carried by said cross arm, and said array, with said tines in contact with a surface upon which leaves and lawn debris are disposed, deflects in a first direction during said leaf and lawn debris raking action, and in a second direction, opposite said first direction, during said leaf and lawn debris pushing action;

(e) said cross arm having a plurality of pairs of apertures for inserting said tines, said apertures of each said pair of apertures being disposed on opposite sides of said cross arm;

(f) each tine of said plurality of tines being composed of a resilient material, each said tine terminating in a looped bend for engaging the outside cylindrical surface of said cross arm by snap action, and each said tine including a ground engaging tip, distal said looped bend and freely disposed for coaction with the surface upon which the lawn rake operates; and (g) each of said apertures of each said pair of apertures has clearance substantially around one said tine of said plurality of tines such that each said tine of said plurality of tines is mountable on and removable from, said cross arm by application of finger force; and said apertures of each said pair of apertures movably position one said tine on said cross arm such that upon application of one or more predetermined forces on one or more said tines during said manipulation of said lawn rake, said one or more tines are laterally repositionable and or axially rotatable within the openings of said apertures of their respective said pair of apertures.

48. The lawn rake of claim 47, wherein said looped bend has a shape including an arc segment of a circle, said looped bend having an inside diameter at said arc segment approximating the outside diameter of said cross arm; and said looped bend pivotally anchors said tine on said cross arm.

49. The lawn rake of claim 48, wherein each said tine of said plurality of tines has a stem intermediate said looped bend and said ground engaging tip, and said stem has a cross-sectional shape that is circular.

50. The lawn rake of claim 49, wherein any said tine of said plurality of tines is releasable from said cross arm during said manipulation of said lawn rake upon application of a predetermined upwardly force on said ground engaging tip.

51. The lawn rake of claim 50, wherein said array is substantially coplanar, said apertures are circular, each said pair of apertures of said plurality of pairs of apertures comprises a top aperture and a bottom aperture, said top apertures are colinear, and said bottom apertures are colinear.

52. The lawn rake of claim 51, wherein said connecting means comprises a truncated tee having a socket portion for connection of said rake handle, and a barrel portion, perpendicular to said socket portion; said barrel portion having an internal cylindrical surface for frictionally engaging said cross arm, with the width of said barrel portion approximating the outside diameter of said socket portion.

53. The lawn rake of claim 52, wherein said member is made from a material selected from the group consisting of aluminum, fiberglass, and thermoplastic; said truncated tee is made from a thermoplastic material; and each said tine of said plurality of tines is made from a material selected from the group consisting of fiberglass and thermoplastic.

54. The lawn rake of claim 53, wherein said member is made from a thermoplastic material selected from the class of thermoplastic materials generally referred to as polyvinylchloride, said truncated tee is made from a thermoplastic material selected from the class of thermoplastic materials generally referred to as polyvinylchloride, and said plurality of tines is made from a thermoplastic material selected from the class of thermoplastic materials generally referred to as polyvinylchloride.

55. The lawn rake of claim 54, wherein said array subtends an obtuse angle with respect to said rake handle.

56. A cross head assembly, comprising:

(a) cross head means serving as a support;

(b) a plurality of tine means forming an array carried by said cross head means for coaction with a surface and or material disposed upon the surface when the cross head assembly is effecting a leaf and lawn debris gathering action;

(c) said cross head means including an elongated cylindrical tube having a plurality of pairs of apertures in spaced arrangement for insertably receiving said tine means; and said tube having a radially symmetric cross section;

(d) each said tine means of said plurality of tine means being loosely positioned by the apertures of one pair of apertures of said plurality of pairs of apertures;

(e) each said tine means of said plurality of tine means being composed of a resilient material, each said tine means including a ground engaging tip, and each said tine means having a looped bend distal said ground engaging tip for releasably engaging the outside cylindrical surface of said tube by snap action;

(f) each said looped bend forms an arc segment of a circle, each said looped bend having an inside radius of curvature at said arc segment approximating the outside radius of curvature of said tube;

(g) said apertures of each said pair of apertures have clearance substantially around one said tine means of said plurality of tine means such that each said tine means is individually mountable on, and individually removable from, said cross head means by application of finger force; and (h) each said tine means has freedom of movement within the lateral constraints of the perimeters of said apertures of its respective said pair of apertures.

57. The cross head assembly of claim 56, wherein said looped bend pivotally anchors said tine means on said cross head means; and said looped bend is releasable from said cross head means during said coaction with said surface upon application of a predetermined upwardly force on the respective ground engaging tip of each of said one or more tine means.

58. The cross head assembly of claim 57, wherein said array is substantially coplanar, said apertures are circular, each said pair of apertures of said plurality of pairs of apertures comprises a top aperture and a bottom aperture, and said top apertures are colinear and said bottom apertures are colinear.

59. The cross head assembly of claim 58, wherein each said tine means of said plurality of tine means further includes a stem intermediate said looped bend and said ground engaging tip, and said stem has a cross-sectional shape that is circular.

60. The cross head assembly of claim 59, wherein said tube is made from a material selected from the group consisting of aluminum, fiberglass, and thermoplastic; and said plurality of tine means is made from a material selected from the group consisting of fiberglass and thermoplastic.

61. The cross head assembly of claim 60, wherein said tube is made from a thermoplastic material selected from the class of thermoplastic materials generally referred to as polyvinylchloride and said plurality of tine means is made from a thermoplastic material selected from the class of thermoplastic materials generally referred to as polyvinylchloride.

62. A cross head assembly, comprising:
(a) a cross head including a tubular, elongated member;
(b) a plurality of tines forming an array carried by said cross head for coaction with a surface and or material disposed upon the surface;
(c) said member having a plurality of pairs of apertures in spaced arrangement, each said pair of apertures-of said plurality of pairs of apertures receiving, and loosely positioning on said cross head, one tine of said plurality of tines; and both of said apertures of each said pair of apertures have clearance substantially around their respective said tine for loosely positioning their respective said tine on said cross head within the openings of the aforementioned both of said apertures;
(d) each said tine of said plurality of tines being composed of a material having resilient flexibility, each said tine including a ground engaging tip, each said tine having a looped bend distal said ground engaging tip for releasably engaging the outside cylindrical surface of said member by snap action, and each said tine further includes a stem intermediate said looped bend and said ground engaging tip;
(e) said looped bend has a shape including an arc segment of a circle, said looped bend having an inside diameter at said arc segment approximating the outside diameter of said member;
(f) each said pair of apertures of said plurality of pairs of apertures insertably receives its respective said tine; said stem of each said tine of said plurality of tines has freedom of movement to laterally reposition and or axially pivot within the openings of both of said apertures of the respective said pair of apertures of each said tine upon application of one or more predetermined forces on each said tine during said coaction; and each said tine is individually removable; and
(g) each said looped bend pivotally anchors its respective said tine on said cross head.

63. The cross head assembly of claim 62, wherein said array is substantially coplanar, said apertures are circular, each said pair of apertures of said plurality of pairs of apertures comprises a top aperture and a bottom aperture, said top apertures are colinear, and said bottom apertures are colinear.

64. The cross head assembly of claim 63, wherein said stem of each said tine of said plurality of tines has a cross-sectional shape that is circular.

65. The cross head assembly of claim 64, wherein said member is made from a material selected from the group consisting of aluminum, fiberglass and thermoplastic; and said plurality of tines is made from a material selected from the group consisting of fiberglass and thermoplastic.

66. The cross head assembly of claim 65, wherein said member is made from a thermoplastic material selected from the class of thermoplastic materials generally referred to as polyvinylchloride and said plurality of tines is made from a thermoplastic material selected from the class of thermoplastic materials generally referred to as polyvinylchloride.

67. The cross head assembly of claim 66, wherein said top aperture and said bottom aperture of each said pair of apertures are diametrically opposed with respect to said member, and said tines have uniform tip spacing.

68. A cross head assembly, comprising:
(a) a tubular elongated member;
(b) a plurality of tine means in spaced arrangement forming an array carried by said member for coaction with a surface and or material disposed upon the surface;
(c) said member having a plurality of pairs of apertures, each pair of apertures of said plurality of pairs of apertures insertably receiving and movably positioning one tine means of said plurality of tine means on said member within the openings of said pair of apertures;
(d) each tine means of said plurality of tine means being composed of a resilient material, each said tine means including a ground engaging tip, each said tine means having a looped bend distal said ground engaging tip for releasably engaging the outside cylindrical surface of said member by snap action, and said looped bend has an inside radius of curvature approximating the outside radius of curvature of said member; and
(e) for each pair of apertures and its respective tine means:
  (i) each aperture of said pair of apertures has clearance all around said tine means when said tine means is manually positioned and held so that it is not touching the perimeter of either aperture of said pair of apertures;
  (ii) said looped bend of said tine means has clearance with respect to said outside cylindrical surface when said tine means is manually positioned and held in contact with the respective point on the perimeter of each said aperture of said pair of apertures, that is closest to said looped bend; and
  (iii) said clearance of each said aperture of said pair of apertures and said clearance of said looped bend, together result in a loose mounting of said tine means on said member such that said tine means can freely wiggle back and forth within the openings of both apertures of said pair of apertures in any direction upon manually shaking said cross head assembly back and forth in said direction.

69. The cross head assembly of claim 68, wherein:
(a) each aperture of each said pair of apertures is circular;
(b) each said tine means of said plurality of tine means has a cross-sectional shape that is circular;
(c) said member is made from a material selected from the group consisting of aluminum, fiberglass, thermoplastic, and polyvinylchloride; and
(d) said plurality of tine means is made from a material selected from the group consisting of fiberglass, thermoplastic, and polyvinylchloride.

70. A cross head assembly, comprising:
(a) a tubular elongated member;
(b) a plurality of tine means in spaced arrangement forming an array carried by said member for coaction with a surface and or material disposed upon the surface;
(c) said member having a plurality of pairs of apertures, each pair of apertures of said plurality of pairs of apertures insertably receiving and movably positioning one tine means of said plurality of tine means on said member within the openings of said pair of apertures;
(d) each tine means of said plurality of tine means being composed of a resilient material, each said tine means including a ground engaging tip, each said tine means having a looped bend distal said ground engaging tip for releasably engaging the outside cylindrical surface of said member by snap action, and said looped bend has an inside radius of curvature approximating the outside radius of curvature of said member; and (e) for each pair of apertures of said plurality of pairs of apertures and the respective tine means positioned within the openings of each pair of apertures:
 (i) each aperture of said pair of apertures has clearance substantially around said tine means; and
 (ii) said clearance, together with said looped bend having resilient flexibility, results in a loose mounting of said tine means on said member such that said tine means can move back and forth within the openings of both apertures of said pair of apertures in any direction upon application of finger force on said tine means in said direction.

71. The cross head assembly of claim 70, wherein:

(a) each said pair of apertures of said plurality of pairs of apertures comprises a top aperture and a bottom aperture, all top apertures are colinear, and all bottom apertures are colinear;

(b) each said tine means of said plurality of tine means has a cross-sectional shape that is circular;

(c) said member is made from a material selected from the group consisting of aluminum, fiberglass, thermoplastic, and polyvinylchloride; and (d) said plurality of tine means is made from a material selected from the group consisting of fiberglass, thermoplastic, and polyvinylchloride.

72. A cross head assembly, comprising:

(a) a tubular elongated member;

(b) a plurality of tine means in spaced arrangement forming an array carried by said member for coaction with a surface and or material disposed upon the surface;

(c) said member having a plurality of pairs of apertures, each pair of apertures of said plurality of pairs of apertures insertably receiving and movably positioning one tine means of said plurality of tine means on said member within the openings of said pair of apertures;

(d) each tine means of said plurality of tine means being composed of a resilient material, each said tine means including a ground engaging tip, each said tine means having a looped bend distal said ground engaging tip for releasably engaging the outside cylindrical surface of said member by snap action, and said looped bend has an inside radius of curvature approximating the outside radius of curvature of said member; and (e) for each pair of apertures together with its respective tine means:
 (i) each aperture of said pair of apertures has clearance substantially around said tine means; and
 (ii) said clearance, together with said looped bend having resilient flexibility, results in a loose mounting of said tine means on said member such that the position and or axial orientation of said tine means within the openings of both apertures of said pair of apertures changes upon application of one or more predetermined forces on said tine means during said coaction.

73. The cross head assembly of claim 72, wherein:

(a) each said aperture of each said pair of apertures is circular;

(b) each said pair of apertures comprises a top aperture and a bottom aperture, each said pair of apertures has an axis extending through the center of said top aperture and the center of said bottom aperture, and all said axes are parallel and coplanar;

(c) each said tine means of said plurality of tine means has a cross-sectional shape that is circular;

(d) said member is made from a material selected from the group consisting of aluminum, fiberglass, thermoplastic, and polyvinylchloride; and (e) said plurality of tine means is made from a material selected from the group consisting of fiberglass, thermoplastic, and polyvinylchloride.

74. A cross head assembly, comprising:

(a) cross head means serving as a support, said cross head means including a tubular elongated member;

(b) a plurality of individually replaceable tine means in side-by-side spaced arrangement forming an array carried by said cross head means for coaction with a surface and or material disposed upon the surface;

(c) said member having a plurality of pairs of circular apertures, each pair of apertures of said plurality of pairs of apertures insertably receiving, and positioning on said cross head means, one tine means of said plurality of tine means;

(d) with respect to each pair of apertures together with its respective tine means, both apertures of each said pair of apertures have clearance substantially around the respective tine means positioned by both said apertures such that each said tine means has freedom of movement to laterally reposition and or axially rotate within the openings of its respective said pair of apertures upon application of one or more predetermined forces on each said tine means during said coaction; and (e) each tine means of said plurality of tine means being composed of a resilient material, each said tine means including a ground engaging tip, and each said tine means having a looped bend distal said ground engaging tip for releasably engaging the outside cylindrical surface of said member by snap action, and said looped bend has a curvature that parallels the curvature of said outside cylindrical surface.

75. The cross head assembly of claim 74, wherein:

(a) said looped bend of each said tine means has clearance with respect to said cross head means when each said tine means is simultaneously in contact with the perimeters of both apertures of its respective said pair of apertures, said contact taking place on the side of both said apertures of each respective said pair of apertures closest to said looped bend; and (b) said clearance of each said aperture of each said pair of apertures, together with said clearance of said looped bend of each said tine means, results in a loose mounting of each said tine means on said cross head means such that each said tine means can freely wiggle back and forth in any direction within the openings of both said apertures of its respective said pair of apertures upon manually shaking said cross head assembly in said direction.

76. The cross head assembly of claim 75, wherein:

(a) each said pair of apertures comprises a top aperture and a bottom aperture, said top apertures are colinear and said bottom apertures are colinear;

(b) each said tine means of said plurality of tine means has a cross-sectional shape that is circular;

(c) said member is made from a material selected from the group consisting of aluminum, fiberglass, thermoplastic, and polyvinylchloride; and (d) said plurality of tine means is made from a material selected from the group consisting of fiberglass, thermoplastic, and polyvinylchloride.

77. The cross head assembly of claim 74, wherein said clearance of both said apertures of each said pair of apertures, and said looped bend of each said tine means having resilient flexibility, together result in a loose mounting of each said tine means on said cross head means such that each said tine means can move back and forth within both said apertures of its respective said pair of apertures in any direction upon application of finger force on each said tine means in said direction.

78. The cross head assembly of claim 77, wherein:
(a) each said pair of apertures of said plurality of pairs of apertures comprises a top aperture and a bottom aperture, said top apertures are colinear, and said bottom apertures are colinear;
(b) each said tine means of said plurality of tine means has a cross-sectional shape that is circular;
(c) said member is made from a material selected from the group consisting of aluminum, fiberglass, thermoplastic, and polyvinylchloride; and
(d) said plurality of tine means is made from a material selected from the group consisting of fiberglass, thermoplastic, and polyvinylchloride.

79. A lawn rake, comprising:
(a) handle means for manipulation of said lawn rake in predetermined manners to effect a raking action;
(b) cross head means connected to said handle means and serving as a support;
(c) a plurality of tines forming an array carried by said cross head means for coaction with a surface and or material disposed upon the surface when the lawn rake is effecting a raking action;
(d) said cross head means including a tubular elongated member having a plurality of pairs of apertures in spaced arrangement, each pair of apertures of said plurality of pairs of apertures insertably receiving and positioning one tine of said plurality of tines on said cross head means within the openings of said pair of apertures;
(e) each tine of said plurality of tines being composed of a resilient material, each said tine including a ground engaging tip, each said tine having a looped bend distal said ground engaging tip for engaging the outside cylindrical surface of said member, and said looped bend has an inside radius of curvature approximating the outside radius of curvature of said member; and
(f) for each pair of apertures and its respective tine:
(i) each aperture of each said pair of apertures has clearance all around its respective said tine when each said tine is manually positioned and held so that each said tine is not touching the perimeter of either aperture of its respective said pair of apertures;
(ii) said looped bend of each said tine has clearance with respect to said outside cylindrical surface when each said tine is manually positioned and held simultaneously in contact with the perimeters of both apertures of its respective said pair of apertures, said contact taking place on the side of said apertures of each respective said pair of apertures closest to said looped bend; and
(iii) said clearance of each said aperture of each said pair of apertures with respect to the respective said tine of each said pair of apertures, and said clearance of said looped bend of each said tine with respect to said outside cylindrical surface, together result in a loose mounting of each said tine on said cross head means such that each said tine can freely wiggle back and forth within both said apertures of its respective said pair of apertures in any direction upon manually shaking said cross head assembly in said direction.

80. The lawn rake of claim 79, wherein:
(a) each aperture of each said pair of apertures is circular;
(b) each said pair of apertures of said plurality of pairs of apertures comprises a top aperture and a bottom aperture, said top apertures are colinear and said bottom apertures are colinear;
(c) each said tine of said plurality of tines has a cross-sectional shape that is circular;
(d) said member is made from a material selected from the group consisting of aluminum, fiberglass, thermoplastic, and polyvinylchloride; and
(e) said plurality of tines is made from a material selected from the group consisting of fiberglass, thermoplastic, and polyvinylchloride.

81. A lawn rake, comprising:
(a) handle means for manipulation of said lawn rake in predetermined manners to effect a raking action;
(b) cross head means connected to said handle means and serving as a support;
(c) a plurality of tines forming an array carried by said cross head means for coaction with a surface and or material disposed upon the surface when the lawn rake is effecting a raking action;
(d) said cross head means including a tubular elongated member having a plurality of pairs of apertures in spaced arrangement, each pair of apertures of said plurality of pairs of apertures insertably receiving and positioning one tine of said plurality of tines on said cross head means within the openings of said pair of apertures;
(e) each tine of said plurality of tines being composed of a resilient material, each said tine including a ground engaging tip, each said tine having a looped bend distal said ground engaging tip for engaging the outside cylindrical surface of said member, and said looped bend has an inside radius of curvature approximating the outside radius of curvature of said member; and
(f) for each pair of apertures and the respective tine positioned within the openings of each pair of apertures:
(i) each aperture of said pair of apertures has clearance substantially around said tine; and
(ii) said clearance, together with said looped bend having resilient flexibility, results in a loose mounting of said tine on said cross head means such that said tine can move back and forth within both apertures of said pair of apertures in any direction upon application of finger force on said tine in said direction.

82. The lawn rake of claim 81, wherein:
(a) each aperture of each said pair of apertures is circular;
(b) each said pair of apertures of said plurality of pairs of apertures comprises a top aperture and a bottom aperture, said top apertures are colinear and said bottom apertures are colinear;
(c) each said tine of said plurality of tines has a cross-sectional shape that is circular;
(d) said member is made from a material selected from the group consisting of aluminum, fiberglass, thermoplastic, and polyvinylchloride; and (e) said plurality of tines is made from a material selected from the group consisting of fiberglass, thermoplastic, and polyvinylchloride.

83. A lawn rake, comprising:
(a) handle means for manipulation of said lawn rake in predetermined manners to effect a raking action;
(b) cross head means connected to said handle means and serving as a support;
(c) a plurality of tines forming an array carried by said cross head means for coaction with a surface and or material disposed upon the surface when the lawn rake is effecting a raking action;
(d) said cross head means including a tubular elongated member having a plurality of pairs of apertures in spaced arrangement, each pair of apertures of said plurality of pairs of apertures insertably receiving and movably positioning one tine of said plurality of tines on said cross head means within the openings of said pair of apertures;
(e) each tine of said plurality of tines being composed of a resilient material, each said tine including a ground engaging tip, each said tine having a looped bend distal said ground engaging tip for engaging the outside cylindrical surface of said member, and said looped bend has an inside radius of curvature approximating the outside radius of curvature of said member; and
(f) for each pair of apertures together with its respective tine:
(i) each aperture of said pair of apertures has clearance substantially around said tine; and
(ii) said clearance, together with said looped bend having resilient flexibility, results in a loose mounting of said tine on said cross head means such that the position and axial orientation of said tine within the openings of both apertures of said pair of apertures changes upon application of one or more predetermined forces on said tine during said coaction.

84. The lawn rake of claim 83, wherein:
(a) each aperture of each said pair of apertures is circular;
(b) each said pair of apertures of said plurality of pairs of apertures comprises a top aperture and a bottom aperture, said top apertures are colinear and said bottom apertures are colinear;
(c) each said tine of said plurality of tines has a cross-sectional shape that is circular;
(d) said member is made from a material selected from the group consisting of aluminum, fiberglass, thermoplastic, and polyvinylchloride; and
(e) said plurality of tines is made from a material selected from the group consisting of fiberglass, thermoplastic, and polyvinylchloride.

\* \* \* \* \*